US012582574B2

(12) United States Patent
Oh et al.

(10) Patent No.: US 12,582,574 B2
(45) Date of Patent: Mar. 24, 2026

(54) MASK, AND SKIN CARE APPARATUS COMPRISING SAME

(71) Applicant: LG INNOTEK CO., LTD., Seoul (KR)

(72) Inventors: Joon Jae Oh, Seoul (KR); Beom Sun Hong, Seoul (KR); Sang Young Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1170 days.

(21) Appl. No.: 17/610,216

(22) PCT Filed: May 6, 2020

(86) PCT No.: PCT/KR2020/005926

§ 371 (c)(1),
(2) Date: Nov. 10, 2021

(87) PCT Pub. No.: WO2020/235833

PCT Pub. Date: Nov. 26, 2020

(65) Prior Publication Data

US 2022/0233400 A1 Jul. 28, 2022

(30) Foreign Application Priority Data

May 17, 2019 (KR) ........................ 10-2019-0058082

(51) Int. Cl.
*A61H 23/02* (2006.01)
*A45D 44/00* (2006.01)
*B06B 1/06* (2006.01)

(52) U.S. Cl.
CPC ....... *A61H 23/0245* (2013.01); *A45D 44/002* (2013.01); *B06B 1/0622* (2013.01);
(Continued)

(58) Field of Classification Search
CPC .......... A61H 23/0245; A61H 2201/105; A61H 2201/10; A61H 2201/165;
(Continued)

(56) References Cited

U.S. PATENT DOCUMENTS 9,061,128 B2 6/2015 Hall et al.
10,406,383 B2 9/2019 Luebcke
(Continued)

FOREIGN PATENT DOCUMENTS

CN 107636415 1/2018
CN 108125779 6/2018
(Continued)

OTHER PUBLICATIONS

Chinese Office Action dated Jan. 3, 2023 issued in Application No. 202080036479.8.
(Continued)

*Primary Examiner* — Joseph D. Boecker
*Assistant Examiner* — Brian T Khong
(74) *Attorney, Agent, or Firm* — KED & ASSOCIATES, LLP

(57) ABSTRACT

A mask according to an embodiment comprises: a first substrate disposed on a first base layer; a first wire disposed on the first substrate; a piezoelectric element disposed on the first wire; a second wire disposed on the piezoelectric element; a second substrate disposed on the second wire; a second base layer disposed on the second substrate; and a cavity disposed between the first base layer and the piezoelectric element, wherein the cavity is disposed in a region overlapping the piezoelectric element in a vertical direction.

19 Claims, 18 Drawing Sheets

(52) U.S. Cl.
CPC .. *A61H 2201/105* (2013.01); *A61H 2201/165* (2013.01); *A61H 2205/022* (2013.01); *B06B 2201/76* (2013.01)

(58) Field of Classification Search
CPC ............ A61H 2205/022; A45D 44/002; A45D 44/22; A45D 2200/207; B06B 1/0622; B06B 1/06; B06B 1/0607; B06B 1/0625; B06B 1/0629; B06B 1/0633; B06B 1/0637; B06B 1/064; A61M 37/00; A61M 37/0092; A61M 2037/0007; A61M 2205/058
See application file for complete search history.

(56) References Cited

U.S. PATENT DOCUMENTS

| | | | | |
|---|---|---|---|---|
| 2005/0162045 | A1 | 7/2005 | Xu et al. | |
| 2008/0139943 | A1* | 6/2008 | Deng | A61M 37/0092 600/459 |
| 2012/0095335 | A1 | 4/2012 | Sverdlik et al. | |
| 2012/0319534 | A1 | 12/2012 | Shirakawa et al. | |
| 2014/0276248 | A1* | 9/2014 | Hall | A61N 1/30 604/20 |
| 2017/0246445 | A1 | 8/2017 | Planard-Luong | |
| 2018/0078970 | A1 | 3/2018 | Ono et al. | |
| 2018/0304598 | A1 | 10/2018 | Drzal et al. | |
| 2020/0061670 | A1* | 2/2020 | Chan | B06B 1/0292 |

FOREIGN PATENT DOCUMENTS

| | | |
|---|---|---|
| CN | 109395241 | 3/2019 |
| CN | 109662883 | 4/2019 |
| JP | 2018-046512 | 3/2018 |
| KR | 10-2007-0090880 | 9/2007 |
| KR | 10-2011-0079096 | 7/2011 |
| KR | 10-2013-0015817 | 2/2013 |
| KR | 10-2015-0135335 | 12/2015 |
| KR | 10-2016-0035202 | 3/2016 |
| KR | 10-1616510 | 4/2016 |

OTHER PUBLICATIONS

Korean Office Action dated Feb. 27, 2024 issued in Application No. 10-2019-0058082.

International Search Report dated Sep. 2, 2020 issued in Application No. PCT/KR2020/005926.

* cited by examiner

【FIG. 1】
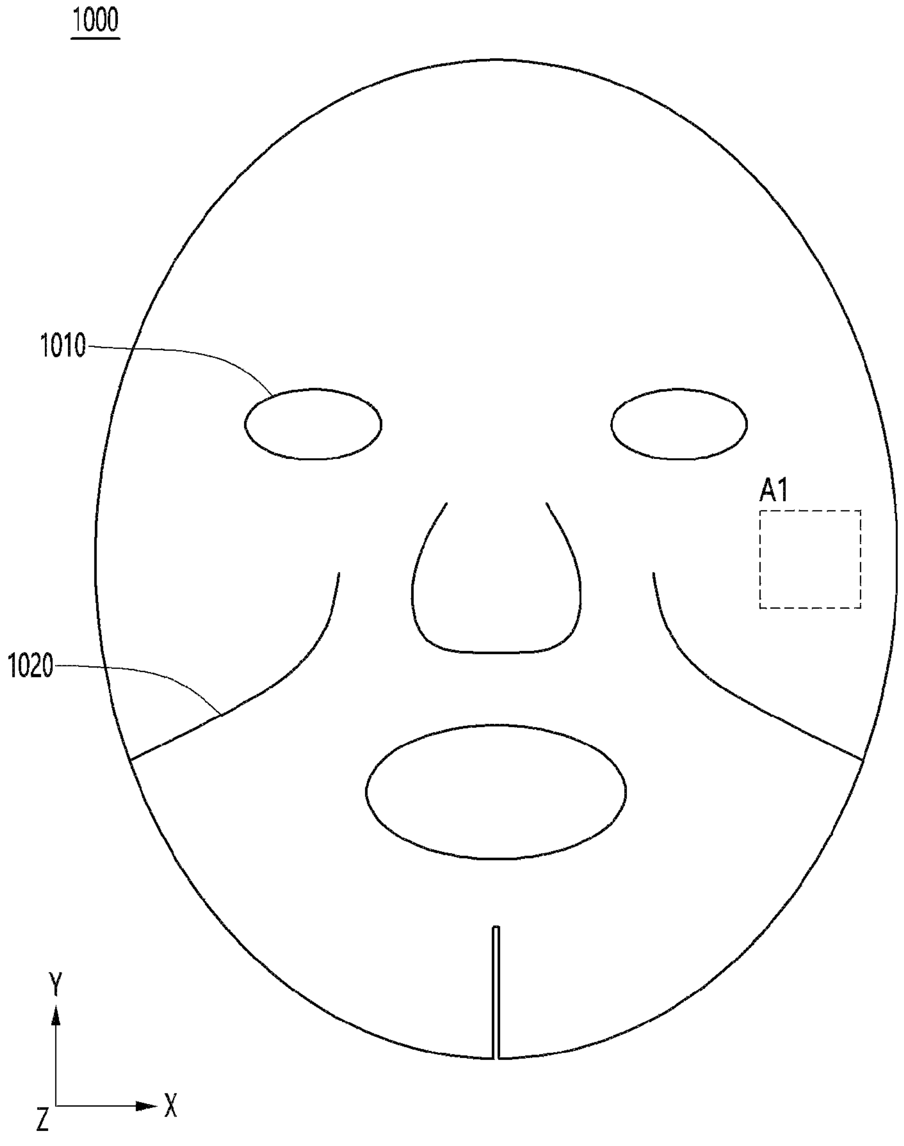

【FIG. 2】
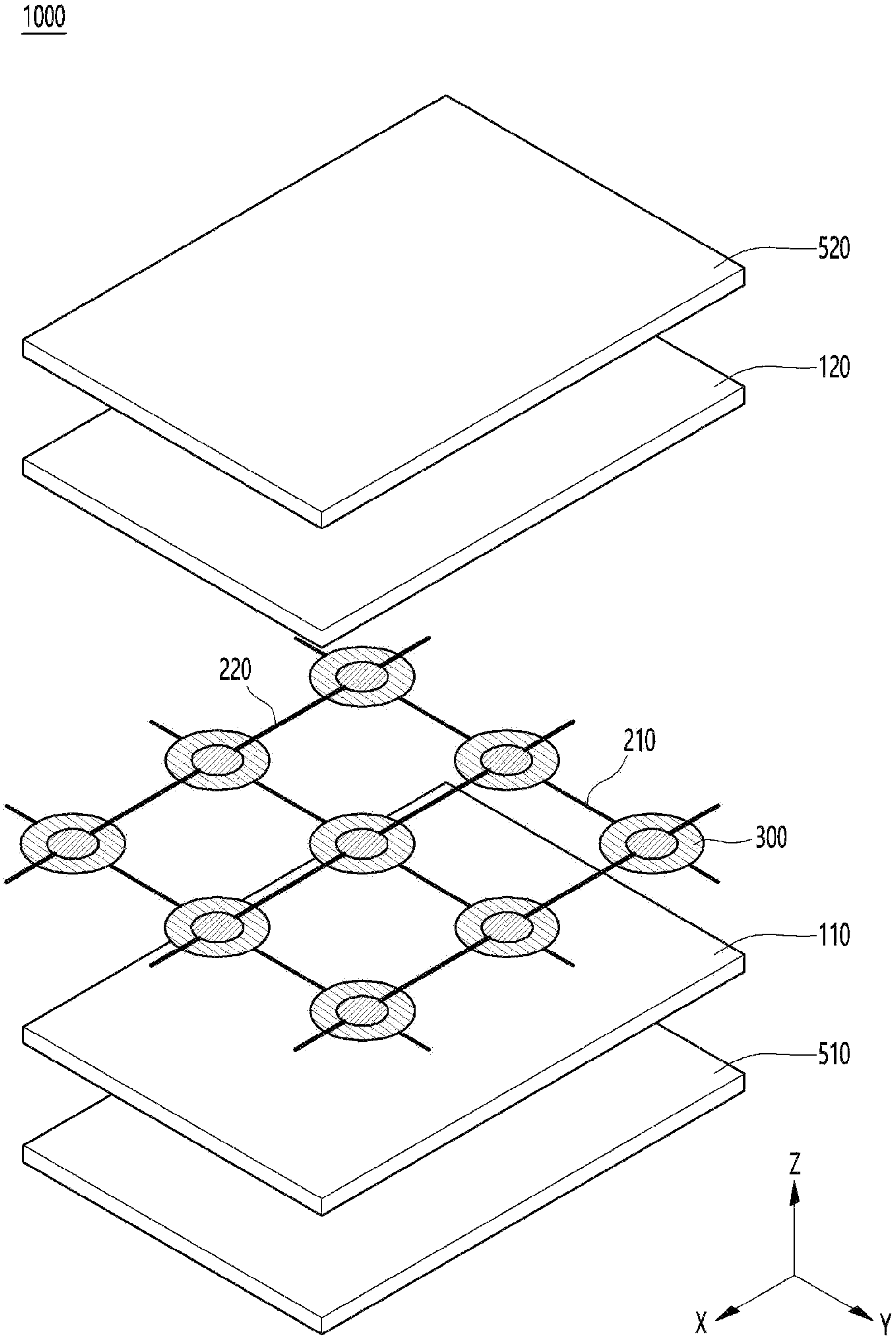

【FIG. 3】
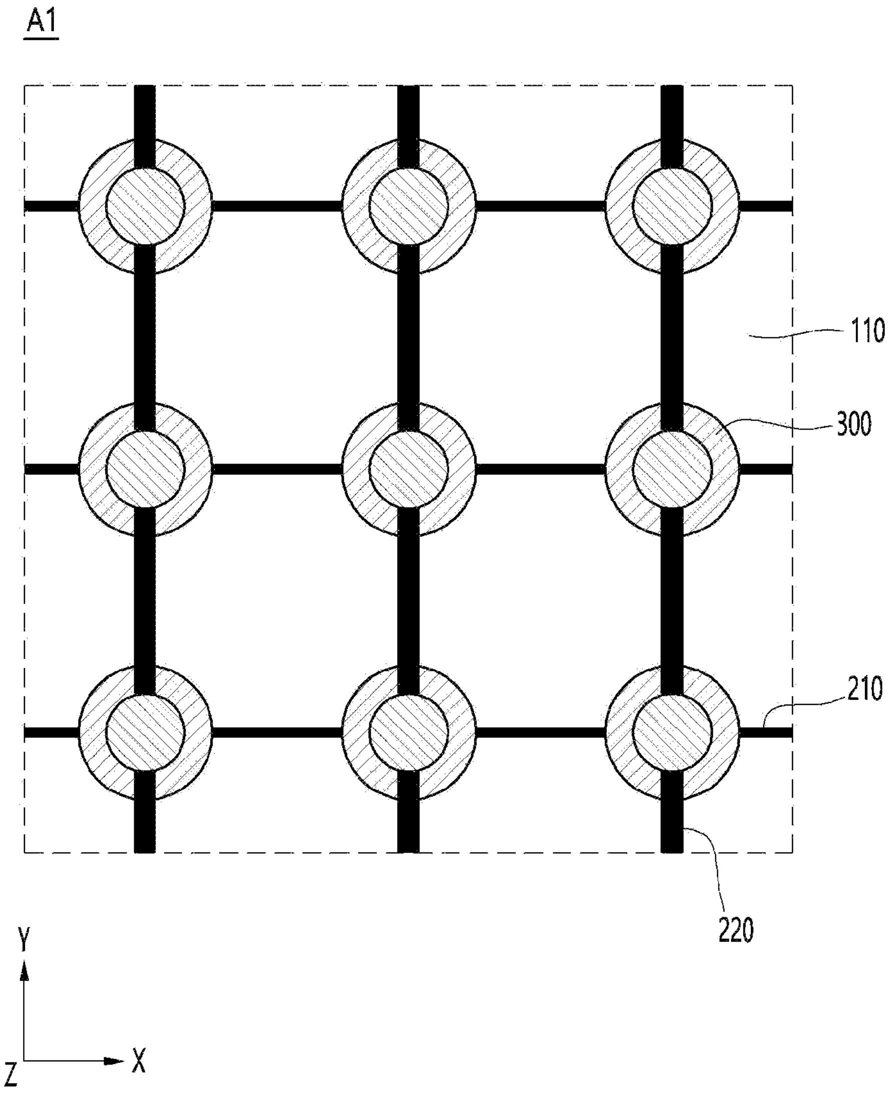

【FIG. 4】
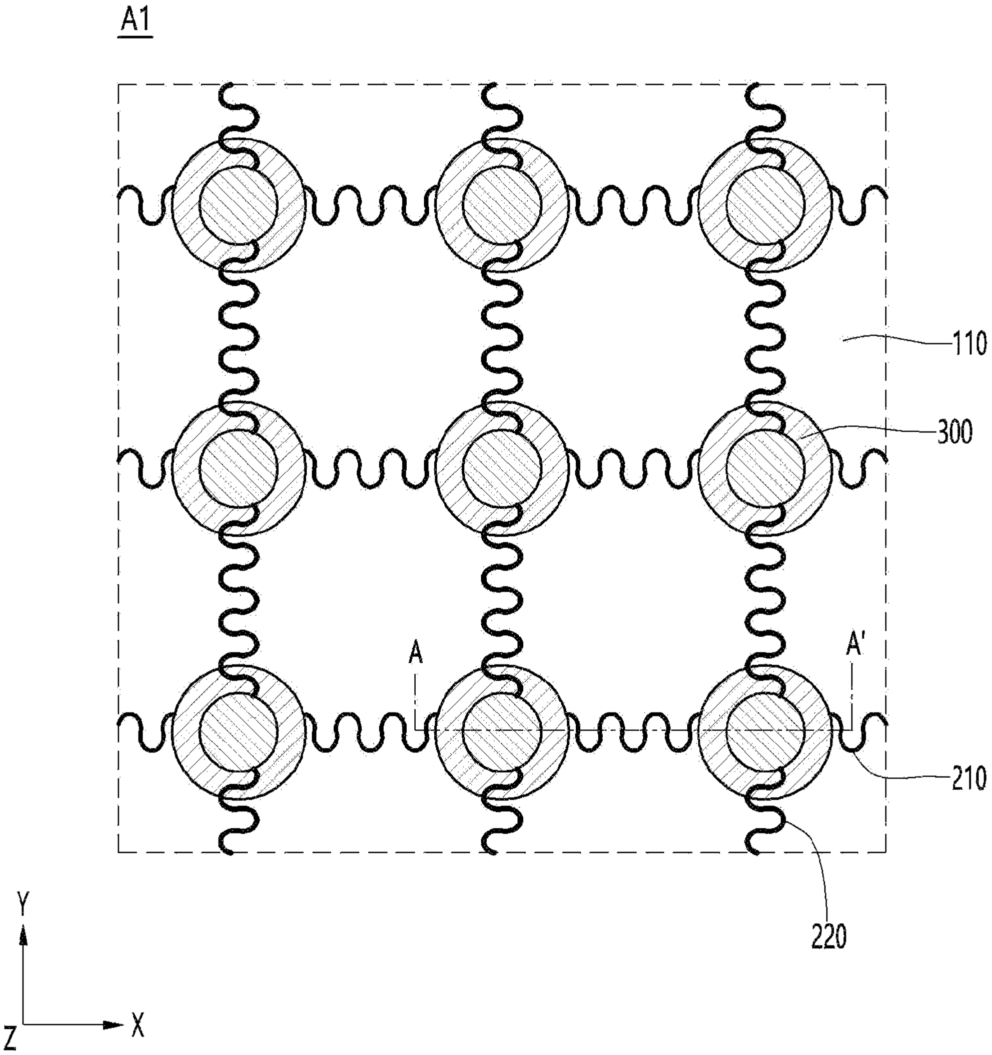

【FIG. 5】
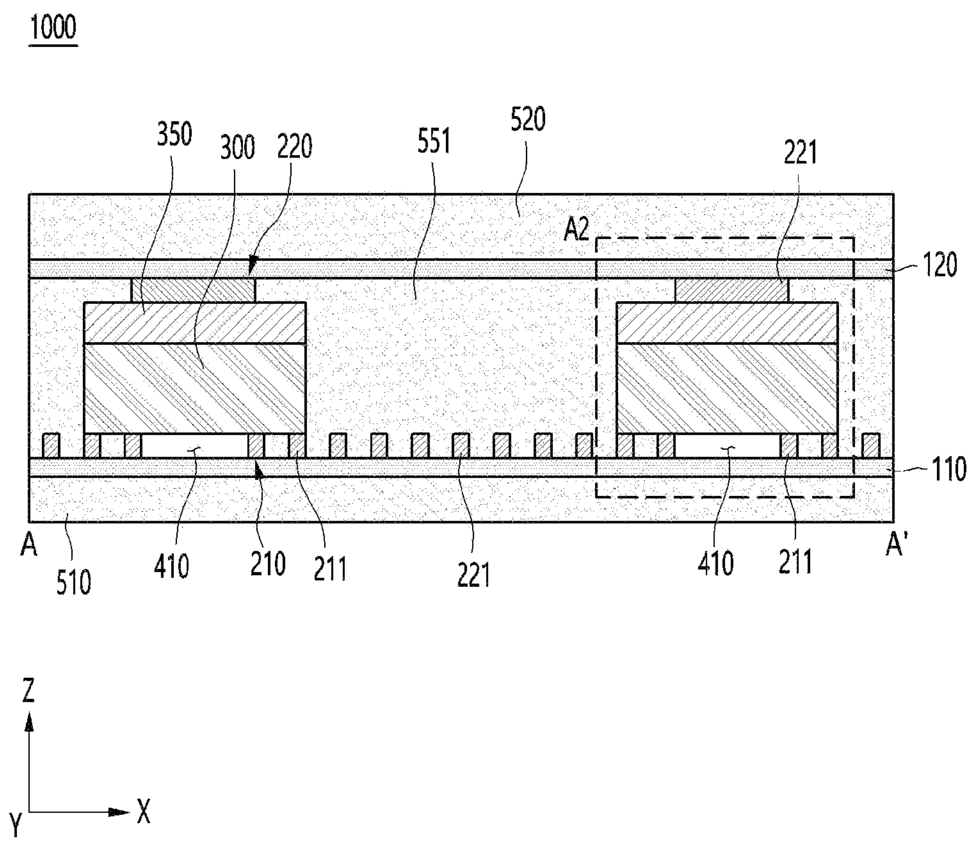

【FIG. 6】
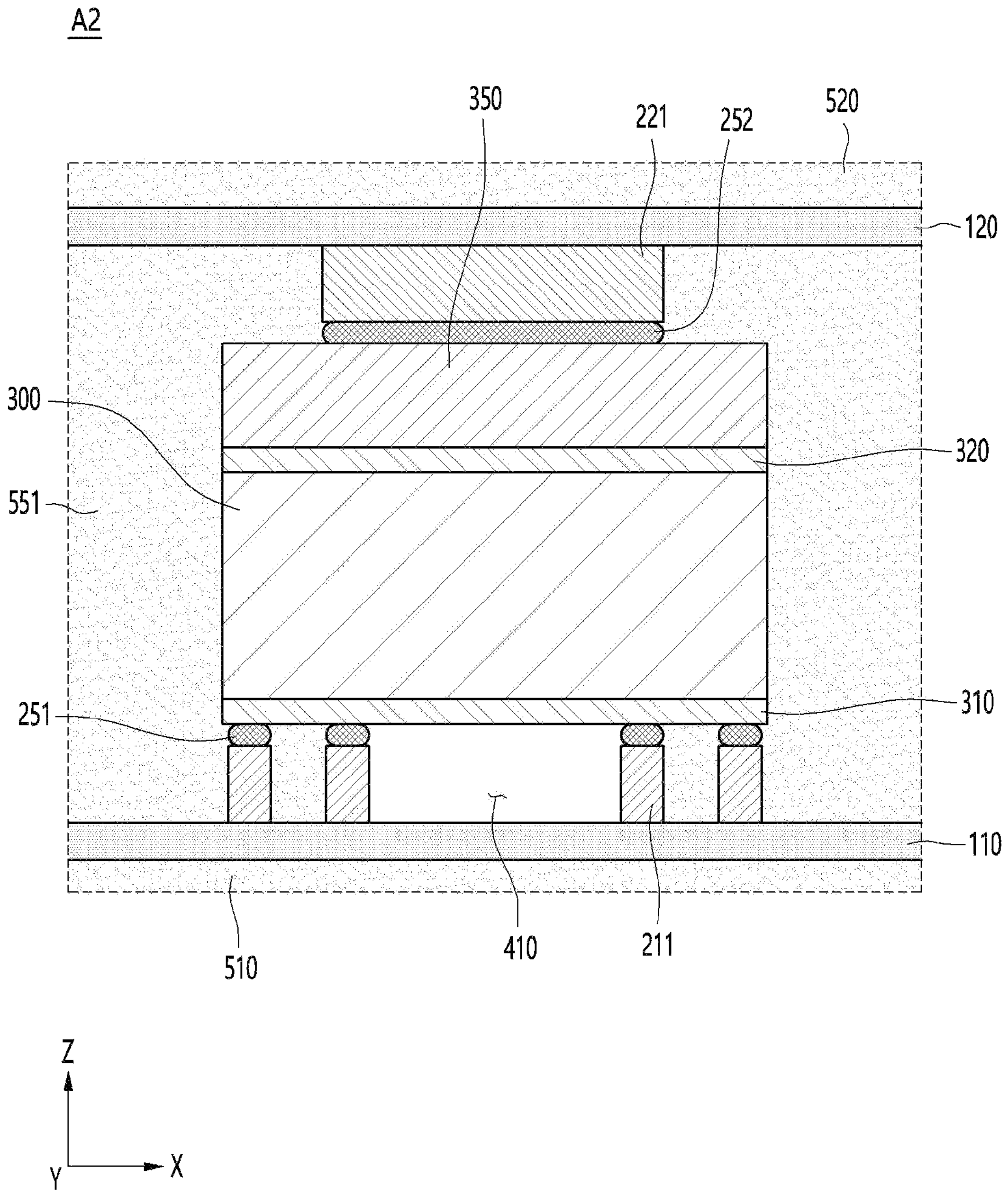

【FIG. 7】
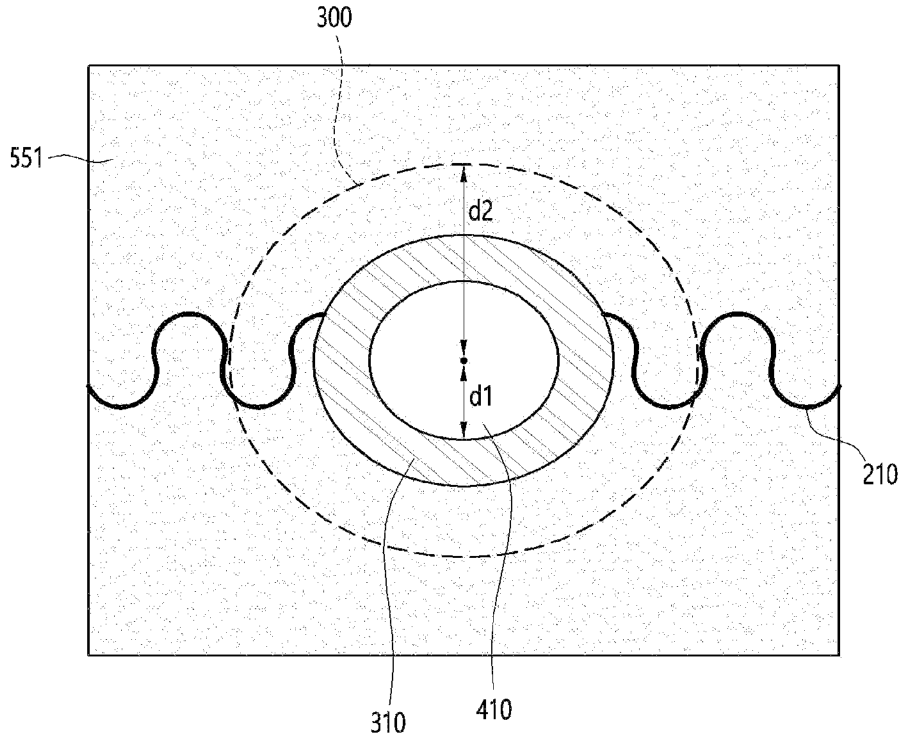

【FIG. 8】
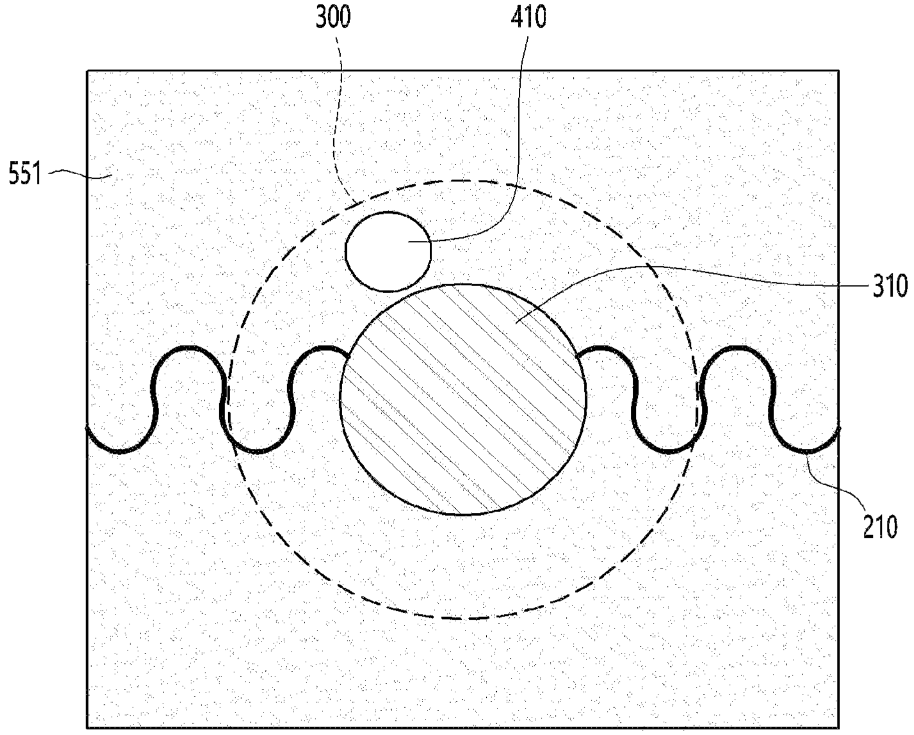

【FIG. 9】
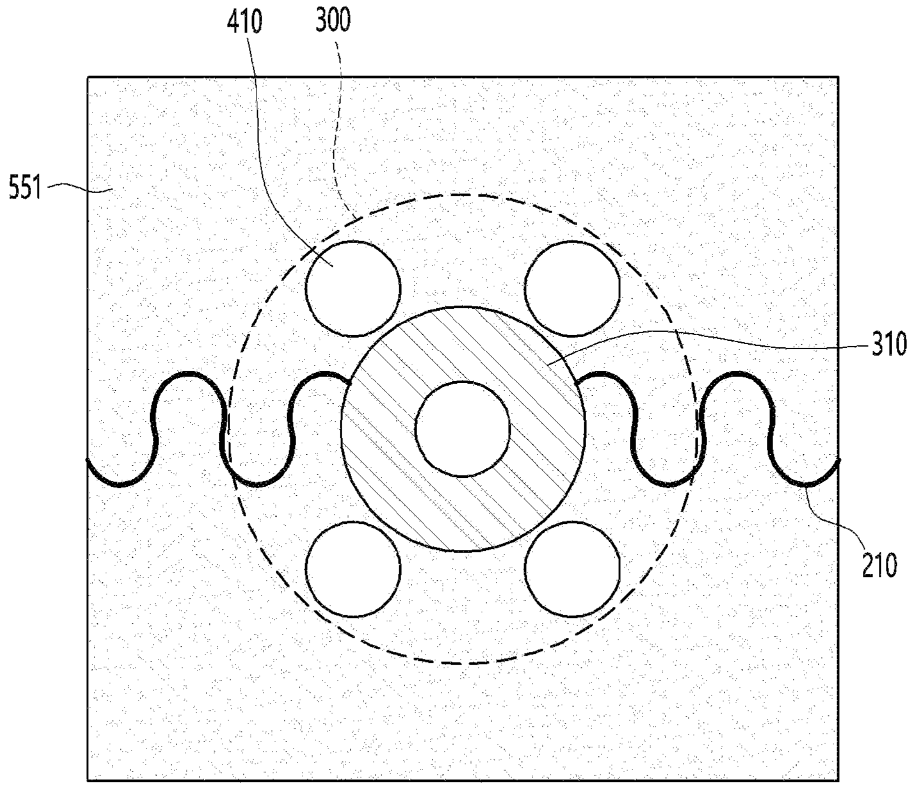

【FIG. 10】
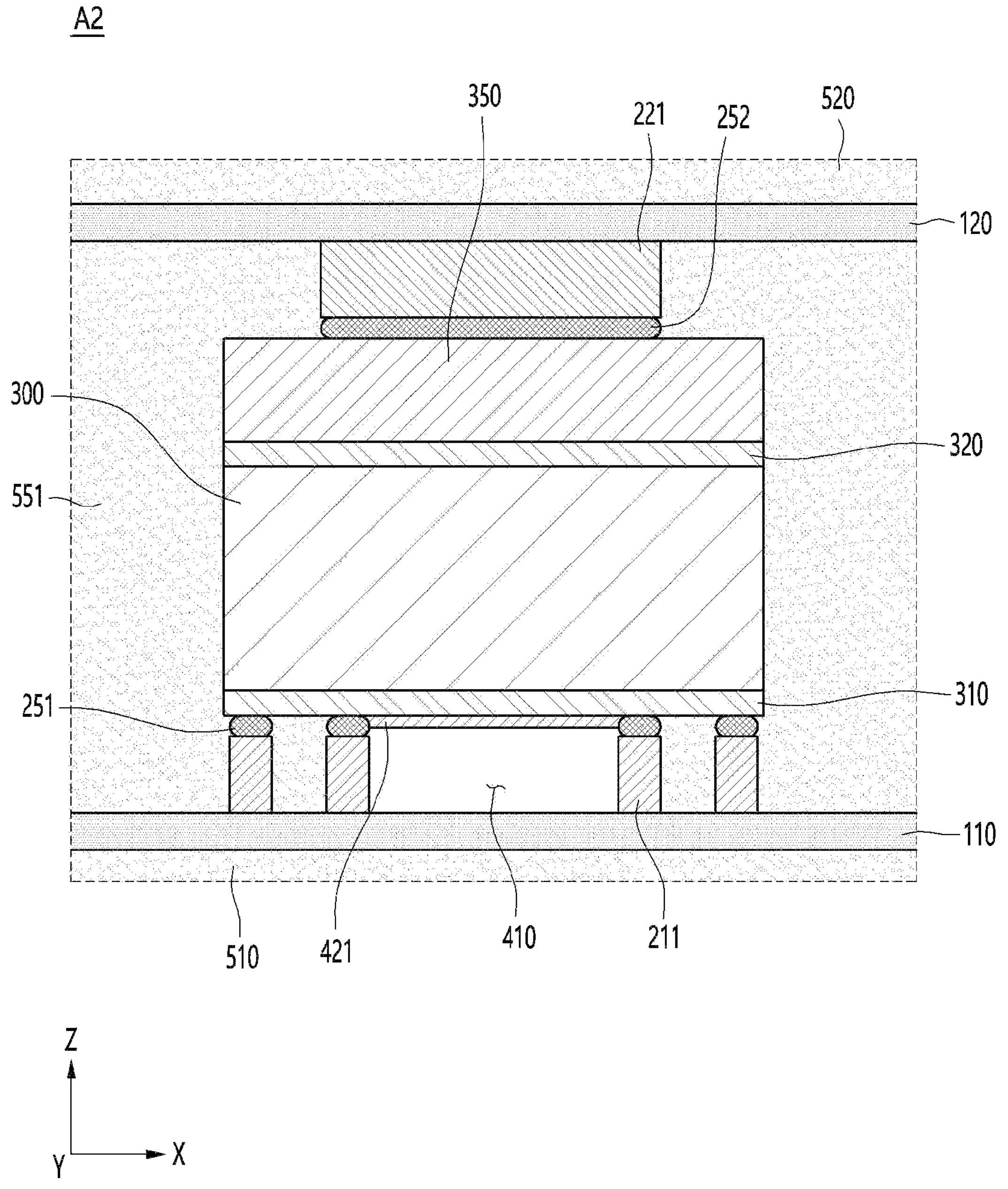

【FIG. 11】
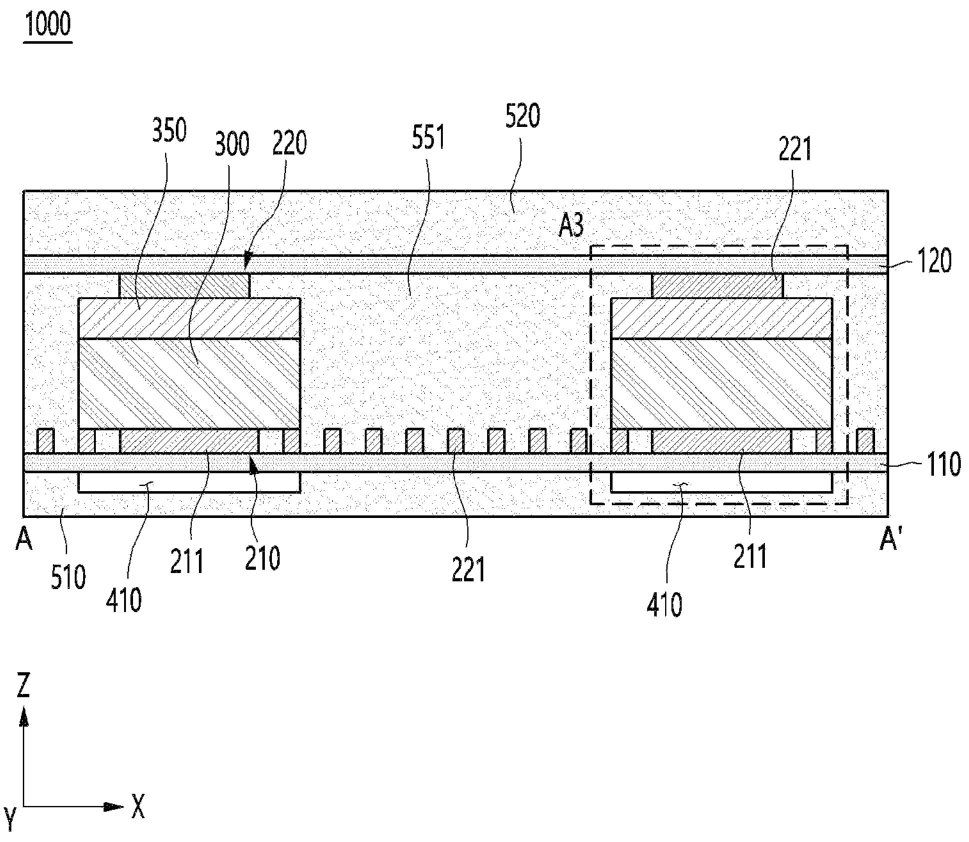

【FIG. 12】
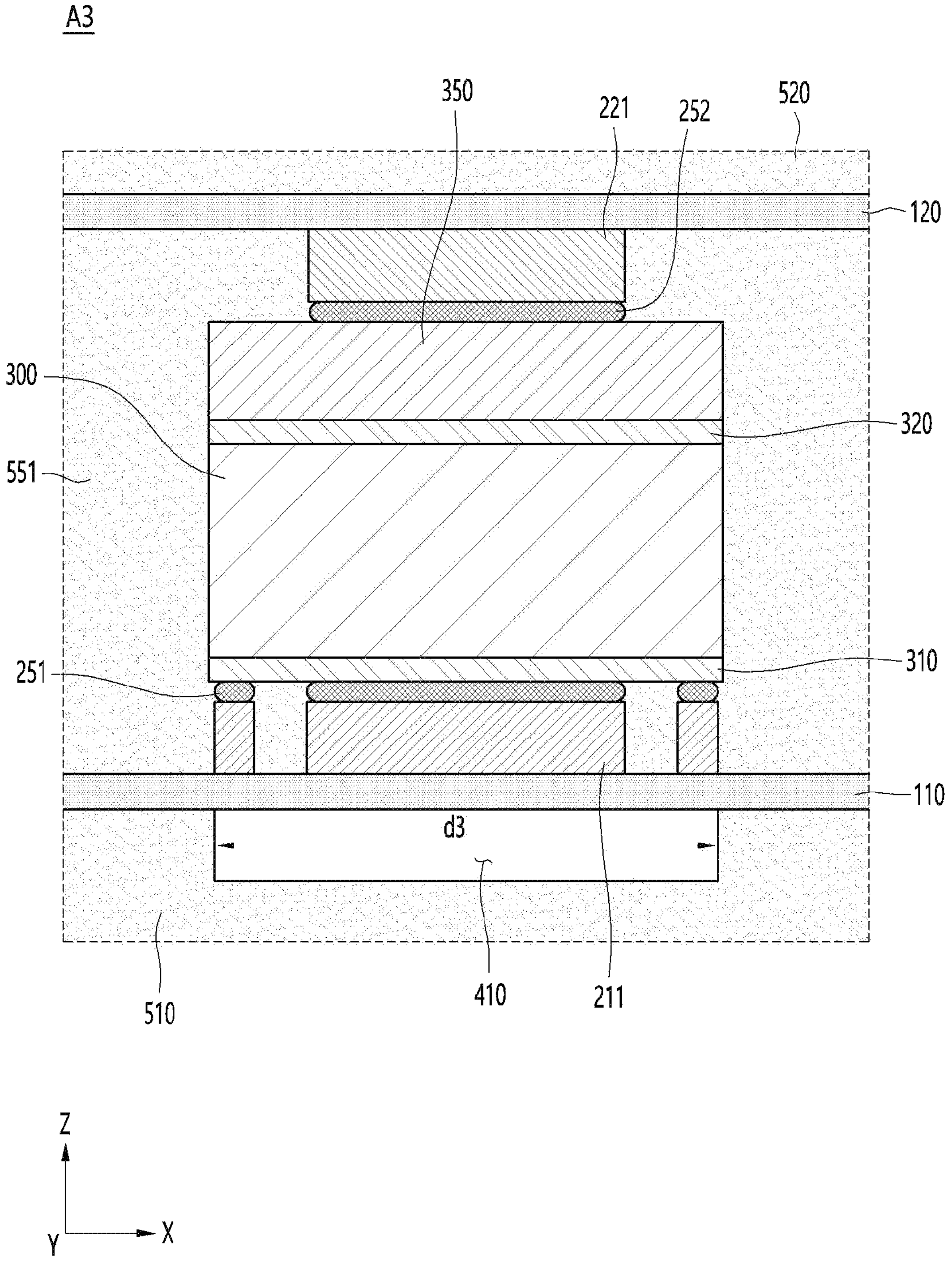

【FIG. 13】
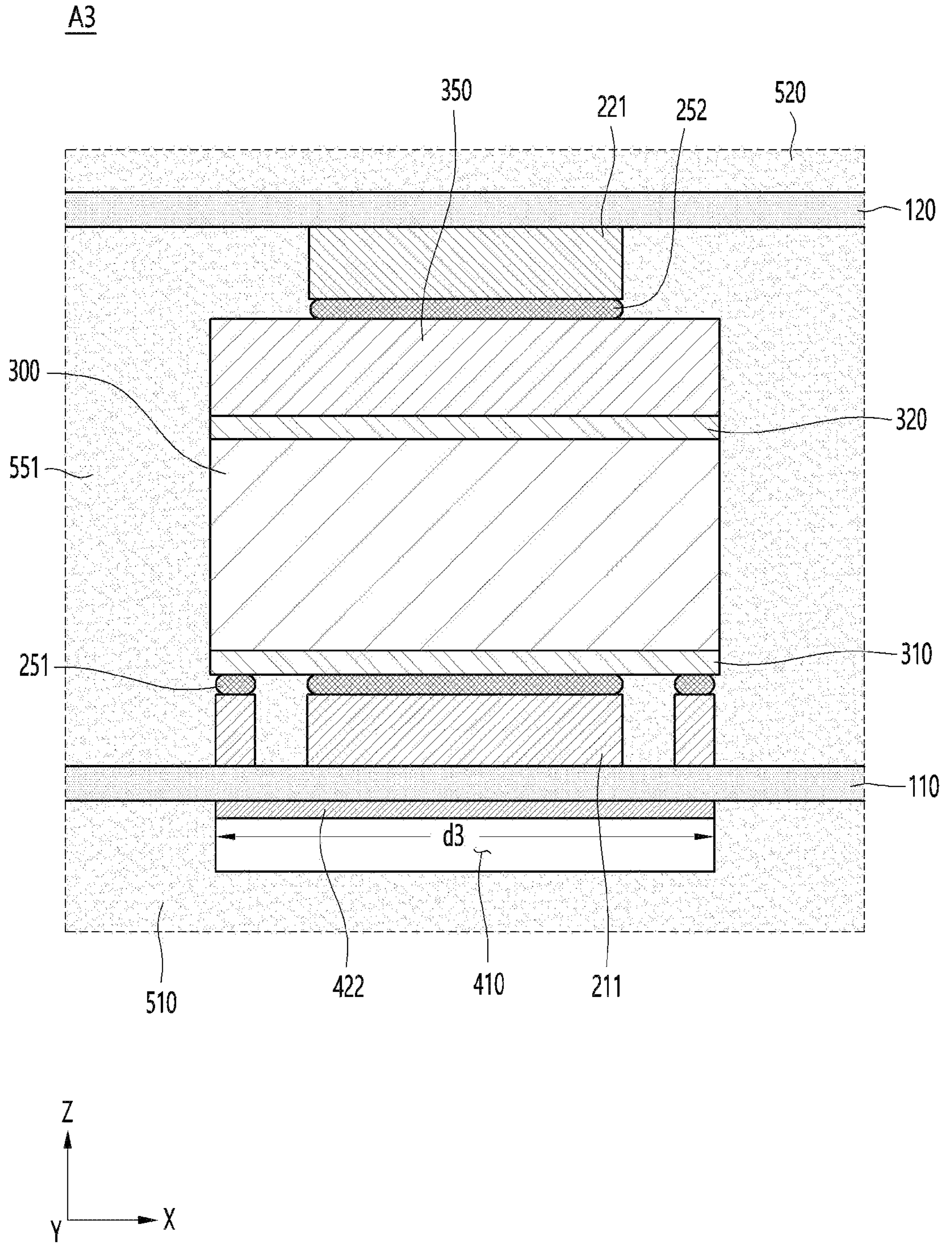

【FIG. 14】
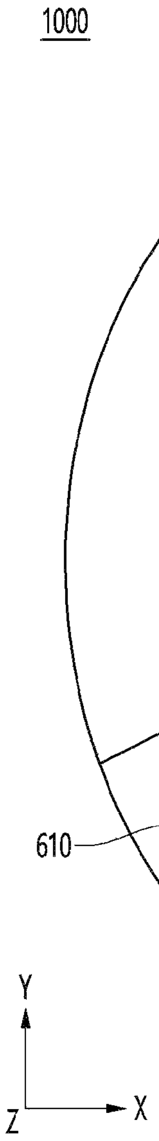

【FIG. 15】
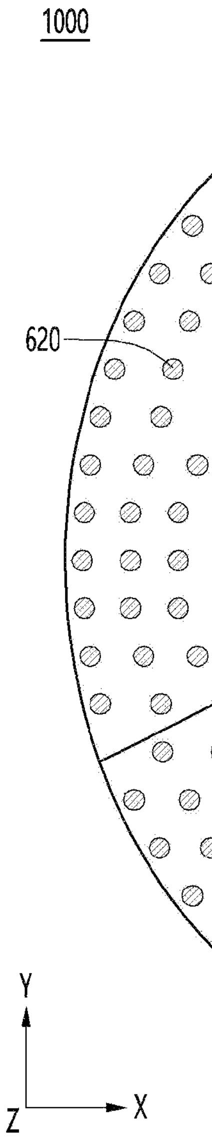

【FIG. 16】
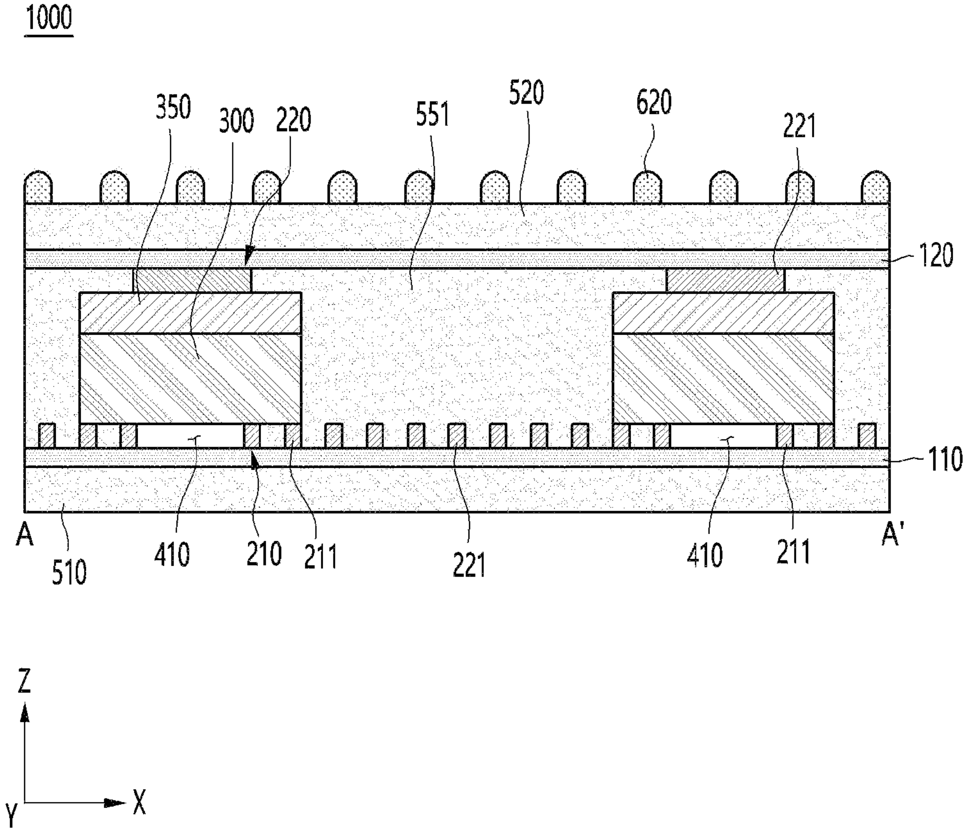

【FIG. 17】
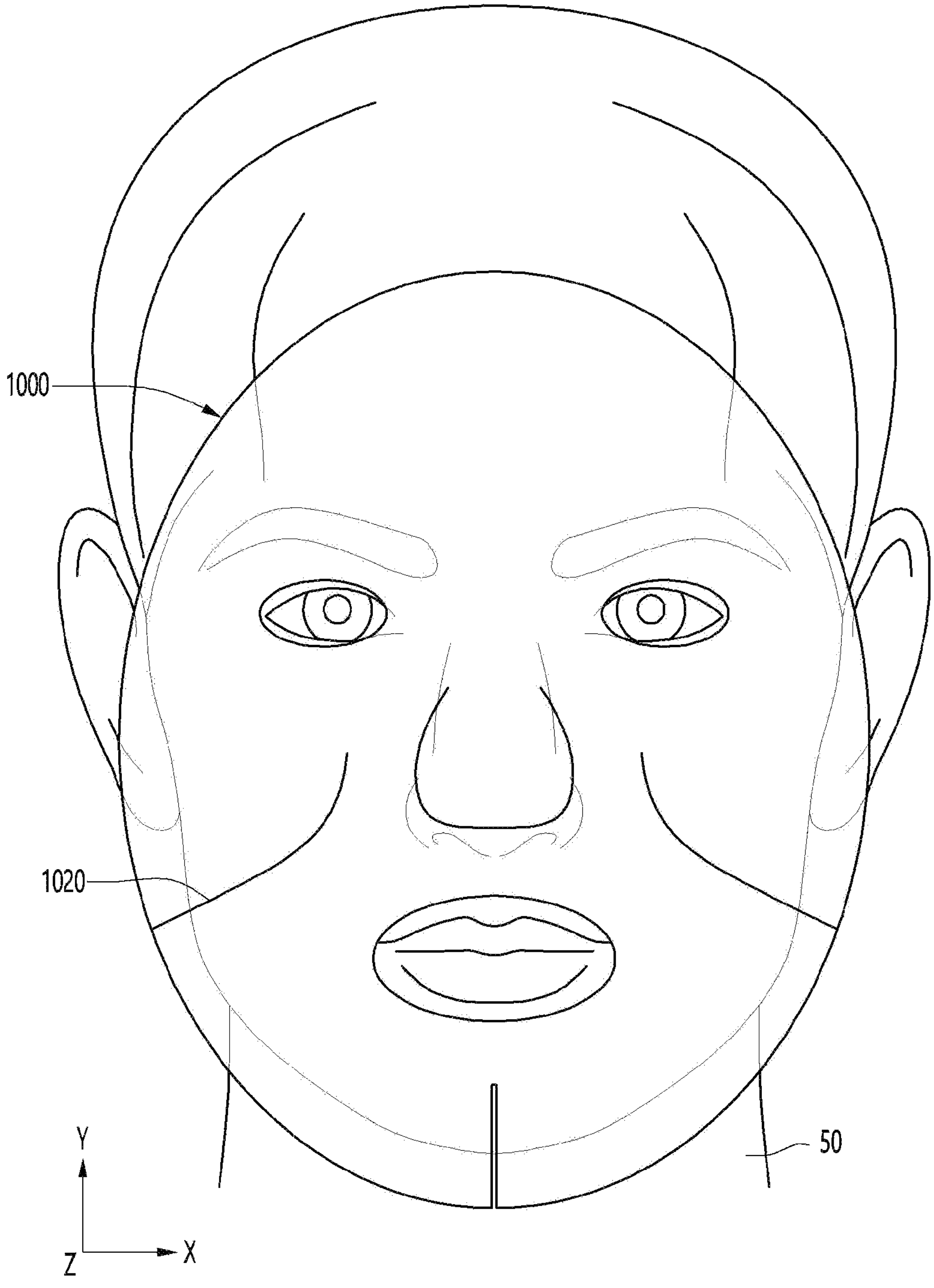

【FIG. 18】
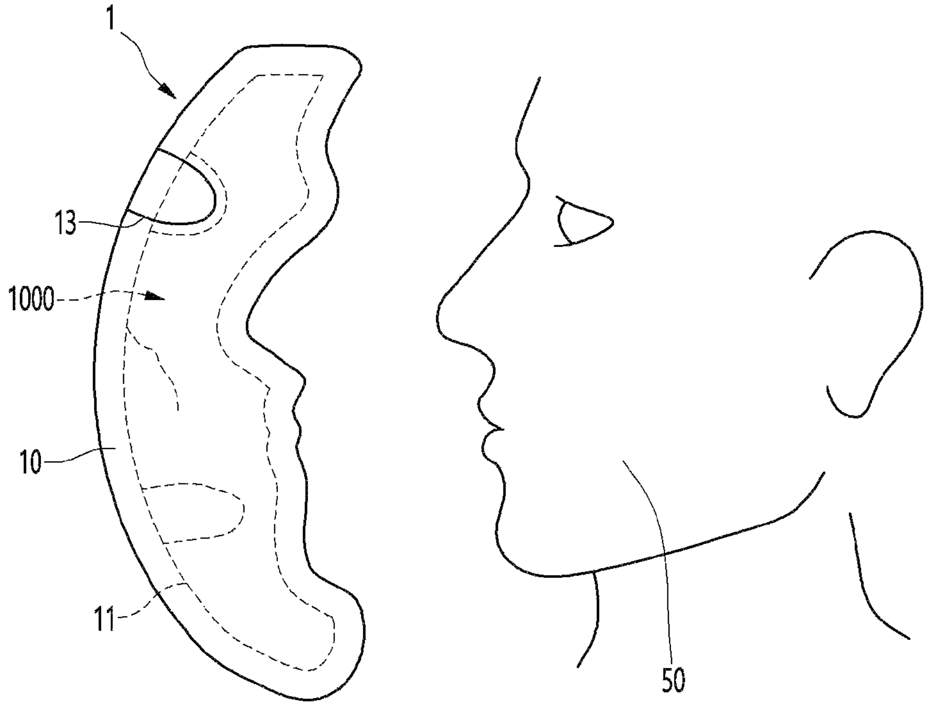

MASK, AND SKIN CARE APPARATUS COMPRISING SAME

CROSS-REFERENCE TO RELATED PATENT APPLICATIONS

This application is a U.S. National Stage Application under 35 U.S.C. § 371 of PCT Application No. PCT/KR2020/005926, filed May 6, 2020, which claims priority to Korean Patent Application No. 10-2019-0058082, filed May 17, 2019, whose entire disclosures are hereby incorporated by reference.

TECHNICAL FIELD

An embodiment relates to a mask and a skin care apparatus.

BACKGROUND ART

Human skin may be damaged or contaminated depending on external factors such as environmental pollution, ultraviolet rays, stress, and the like, and wrinkles may occur due to internal factors such as aging, hormonal changes, and the like. Recently, as interest in the skin has increased, various apparatuses for skin treatment, beauty, and anti-aging have been developed.

In detail, an apparatus has been developed, which is capable of applying thermal energy to the skin, for example, an apparatus capable of improving skin elasticity by applying infrared energy. In addition, an apparatus using sound waves or light rays has been developed in order to effectively inject cosmetics or drugs into the skin. For example, an apparatus has been developed, which is capable of forming a path through which cosmetics or drugs are injected into the skin using sonophoresis and laserporation. In addition, an apparatus using electric propulsion force has been developed in order to effectively inject cosmetics or drugs into the skin. For example, an apparatus has been developed, which is capable of effectively injecting ionic substances contained in cosmetics or drugs into the skin using iontophoresis, electroporation, and electroosmosis. That is, various apparatuses have been developed, which is capable of caring or treating a user's skin by providing light energy, microcurrent, vibration, or the like to the skin.

In general, the above-described apparatuses may be provided in a form of a patch detachable to the skin, and the apparatuses are attached to a specific skin region to care or treat the skin of the attached region. In addition, the above-described apparatuses are provided in a form of a mask pack disposed to cover the entire user's face to care or treat the facial skin.

However, the apparatuses have a problem that it is difficult to effectively adhere to curved skin surfaces such as both cheeks, nose, and the like. In detail, it may be difficult to effectively adhere to the user's skin due to materials and variable characteristics of the apparatus. Accordingly, the apparatus may be operated in a state in which the apparatus is not completely adhered to the user's skin, and the apparatus may be separated from the user's skin due to the user's movement or vibration of the apparatus during the operation thereof.

Accordingly, the apparatus may be operated in a state in which it is not completely adhered to the user's skin and may be spaced apart from the user's skin by the user's movement and vibration of the apparatus during operation. Thus, there is a problem that it is difficult to effectively obtain a care or treatment effect through the apparatus.

Therefore, a new mask capable of solving the above-described problem is required.

DISCLOSURE

Technical Problem

An embodiment is to provide a mask and a skin care apparatus that have variability and improved reliability.

In addition, an embodiment is to provide a mask and a skin care apparatus capable of effectively adhering to a user's skin.

In addition, an embodiment is to provide a mask and a skin care apparatus capable of providing uniform ultrasonic energy to a user's skin.

In addition, an embodiment is to provide a mask and skin care apparatus capable of reducing the overall thickness and weight.

In addition, an embodiment is to provide a mask and a skin care apparatus capable of minimizing the loss of ultrasonic energy generated during operation.

Technical Solution

A mask according to an embodiment includes a first substrate disposed on a first base layer, a first wire disposed on the first substrate, a piezoelectric element disposed on the first wire, a second wire disposed on the piezoelectric element, a second substrate disposed on the second wire, a second base layer disposed on the second substrate, and a cavity disposed between the first base layer and the piezoelectric element, wherein the cavity is disposed in a region overlapping the piezoelectric element in a vertical direction.

In addition, a skin care apparatus according to an embodiment includes a main body in which one side thereof is open and an accommodation space is formed inside the open region and the mask disposed in the open region and connected to the main body.

Advantageous Effects

A mask according to an embodiment may be varied according to a shape of a curved skin of a user by a substrate having a variable material, a first base layer, a second base layer, or the like. Accordingly, the mask can effectively adhere to the skin of the user.

In addition, the mask according to the embodiment may include a plurality of piezoelectric elements, and the piezoelectric elements may generate ultrasonic energy in the entire region of the mask. Accordingly, it is possible to provide ultrasonic energy having uniform intensity to a user wearing the mask.

In addition, the piezoelectric elements according to the embodiment may be disposed at different intervals according to a face shape of the user. For example, the piezoelectric elements disposed in a relatively curved region such as nose, cheeks, and the like and a planar region such as forehead of the user are disposed at different intervals from each other, and accordingly, it is possible to provide the ultrasonic energy having uniform intensity to the curved region of the user's face.

In addition, the mask according to the embodiment may include a cavity and may effectively reflect the ultrasonic energy by the cavity. Accordingly, it is possible to minimize the loss of ultrasonic energy generated during operation of the piezoelectric element. In addition, since a required thickness of the first base layer can be reduced, the overall thickness and weight of the mask can be reduced.

DESCRIPTION OF DRAWINGS

FIG. 1 is a front view of a mask according to an embodiment.

FIG. 2 is an exploded perspective view of region A1 in FIG. 1.

FIG. 3 is a top view of the region A1 in FIG. 1.

FIG. 4 is another top view of the region A1 in FIG. 1.

FIG. 5 is a cross-sectional view taken along line A-A' of FIG. 4.

FIG. 6 is an enlarged view of region A2 in FIG. 5.

FIGS. 7 to 9 are views for describing an arrangement position of a cavity in the mask according to the embodiment.

FIG. 10 is another enlarged view of the region A2 of FIG. 5.

FIG. 11 is another cross-sectional view taken along line A-A' of FIG. 4.

FIG. 12 is an enlarged view of region A3 in FIG. 11.

FIG. 13 is another enlarged view of region A3 in FIG. 11.

FIGS. 14 to 16 are views illustrating an example in which an indicator and a protrusion are provided on the mask according to the embodiment.

FIG. 17 is a view illustrating a user wearing the mask according to the embodiment.

FIG. 18 is a view illustrating a skin care apparatus to which the mask according to the embodiment is applied.

MODES OF THE INVENTION

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

In addition, in describing the elements of the embodiments of the present invention, the terms such as first, second, A, B, (A, and (b) may be used. These terms are only used to distinguish the elements from other elements, and the terms are not limited to the essence, order, or order of the elements. Further, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements. Furthermore, when expressed as "on (over)" or "under (below)", it may include not only the upper direction but also the lower direction based on one element.

In addition, before describing the embodiments of the present invention, a first direction may refer to an x-axis direction shown in the drawings, and a second direction may be a different direction from the first direction. As an example, the second direction may refer to a y-axis direction shown in the drawing in a direction perpendicular to the first direction. In addition, a horizontal direction may refer to the first and second directions, and a vertical direction may refer to a direction perpendicular to at least one of the first and second directions. For example, the horizontal direction may refer to the x-axis and y-axis directions of the drawing, and the vertical direction may be a z-axis direction of the drawing and a direction perpendicular to the x-axis and y-axis directions.

FIG. 1 is a front view of a mask according to an embodiment, and FIG. 2 is an exploded perspective view of region A1 in FIG. 1. In addition, FIG. 3 is a top view of the region A1 in FIG. 1, and FIG. 4 is another top view of the region A1 in FIG. 1. In addition, FIG. 5 is a cross-sectional view taken along line A-A' of FIG. 4, and FIG. 6 is an enlarged view of region A2 in FIG. 5.

Referring to FIGS. 1 to 6, a mask 1000 according to the embodiment may be provided in a predetermined size to cover a user's face and have a predetermined elasticity in order to be closely adhered to the user's face. The mask 1000 may include one surface in contact with the user's skin and the other surface opposite to the one surface, and the one surface of the mask 1000 may be made of a material that is harmless to the human body, so that it is harmless despite being in contact with the user's skin for a long time.

The mask 1000 may include at least one of an opening 1010 and a cutout portion 1020. In detail, the opening 1010 may be formed in a portion corresponding to the user's eyes or mouth. The opening 1010 is a region penetrating through one surface and the other surface of the mask 1000 facing the user's skin, and when the user wears the mask 1000, the user's eyes and mouth may be inserted into the opening 1010, and a region excluding the opening 1010 may be closely adhered to the user's face. In addition, the cutout portion 1020 may be formed in a portion corresponding to both cheek lines, chin, and the like, which are relatively curved in order to improve adhesion between the mask 1000 and the skin. The cutout portion 1020 may have a form in which one surface and the other surface of the mask 1000 are partially cut.

The region excluding the opening 1010 in the mask 1000 according to the embodiment may include a first substrate 110, a first wire 210, a piezoelectric element 300, a second wire 220, a second substrate 120, a first base layer 510, a second base layer 520, and a cavity 410.

The first substrate 110 may be transparent and include a material in consideration of moisture barrier properties, thermal stability, and the like. In addition, the first substrate 110 may include a material that has flexibility and varies according to a shape of the user's curved skin. As an example, the first substrate 110 may include a resin material such as polyethylene terephthalate (PET), polyethylene naphthalate (PEN), and polyimide (PI). The first substrate 110 may be provided in a form of a film.

The first substrate 110 may have a thickness of about 0.5 μm to about 5 μm or less. When the thickness of the first substrate 110 is less than about 0.5 μm, there may be a problem that a region of the first substrate 110 overlapping the components is struck by a weight of the components disposed on the first substrate 110, for example, the piezoelectric element 300. Accordingly, reliability of the first substrate 110 may be deteriorated, and a problem of alignment of the components disposed on the first substrate 110 may occur. In addition, when the thickness of the first substrate 110 exceeds about 5 μm, the overall thickness of the mask 1000 may be increased. Accordingly, there is a problem that the mask 1000 may not be efficiently varied according to the shape of the user's skin, and thus the mask 1000 does not effectively adhere to the user's skin. Preferably, the first substrate 110 may have a thickness of about 0.5 μm to about 3 μm. When the thickness of the first substrate 110 satisfies the above-described range, the first substrate 110 may be efficiently varied in a form corresponding to the user's skin and the overall thickness and weight of the mask 1000 may be reduced while maintaining reliability and alignment characteristics.

The first wire 210 may be disposed on the first substrate 110. The first wire 210 may be electrically connected to the piezoelectric element 300. The first wire 210 may include a conductive material. As an example, the first wire 210 may include at least one metal of aluminum (Al), copper (Cu), silver (Ag), gold (Au), chromium (Cr), nickel (Ni), molybdenum (Mo), titanium (Ti), and alloys thereof. In addition, the first wire 210 may include a non-metal such as carbon, and the like.

The first wire 210 may be disposed on one surface of the first substrate 110 facing the piezoelectric element 300. The first wire 210 may be in direct contact with one surface of the first substrate 110 and extend in the first direction. The first wire 210 may be formed on one surface of the first substrate 110 by a process such as deposition or printing.

The first wire 210 may include a plurality of first sub-wires 211 disposed on the first substrate 110. The plurality of first sub-wires 211 may extend in the first direction and may be disposed to be spaced apart from each other in the second direction different from the first direction. The plurality of first sub-wires 211 may be electrically connected to each other. Here, the second direction may be a direction different from the first direction and may be the vertical direction, for example, but the embodiment is not limited thereto.

A thickness of the first sub-wire 211 may be about 2 μm to about 50 μm. In detail, the thickness of the first sub-wire 211 may be about 2 μm to about 40 μm. When the thickness of the first sub-wire 211 is less than about 2 μm, electrical characteristics may be deteriorated, and it may be difficult to form uniformly. In addition, when the thickness of the first sub-wire 211 exceeds about 50 μm, the overall thickness of the mask 1000 may increase, and a manufacturing time of the first wire 210 may increase. In addition, the thickness of the first sub-wire 211 is too thick, and thus the stretchable characteristics may be deteriorated. Preferably, the thickness of the first sub-wire 211 may be about 5 μm to about 35 μm or less in consideration of stretchable characteristics in the horizontal direction, reliability, and process efficiency.

In addition, a line width of the first sub-wire 211 may be greater than the thickness of the first sub-wire 211. The line width of the first sub-wire 211 may be about 50 μm to about 500 μm. In detail, the line width of the first sub-wire 211 may be about 100 μm to about 450 μm. When the line width of the first sub-wire 211 is less than about 50 μm, reliability may be deteriorated, and when the line width of the first sub-wire 211 exceeds about 500 μm, an elongation may decrease and the stretchable characteristics may be deteriorated. Preferably, the line width of the first sub-wire 211 may be about 100 μm to about 400 μm in consideration of the stretchable characteristics.

The first wire 210 may have various shapes. For example, when viewed in a plane, each of the plurality of first sub-wires 211 may have a shape extending in the first direction as shown in FIG. 3. In detail, the plurality of first sub-wires 211 may have equivalent intervals from the adjacent first sub-wires 211 and may have a linear shape extending in the first direction.

Alternatively, when viewed in a plane, each of the plurality of first sub-wires 211 may have a curved shape extending in the first direction. For example, each of the plurality of first sub-wires 211 may be provided in a form in which a wavy pattern is repeated. In this case, the first sub-wire 211 may have a curvature pattern of about 3R to about 20R (mm). Accordingly, when the mask 1000 is stretched or contracted in one direction, the first wire 210 may have the stretchable characteristics and may not be cut. Preferably, the first sub-wire 211 may have a curvature pattern of about 5R to about 15R (mm). In addition, the first sub-wire 211 may have an elongation of about 10% to about 50%. Accordingly, the first wire 210 may have more improved stretchable characteristics, thereby improving reliability and improving adhesion to the user's skin.

Still alternatively, although not shown in the drawing, when viewed in a plane, each of the plurality of first sub-wires 211 may have a shape in which a pattern in which a straight line and a curve extending in the first direction are mixed is repeated. For example, when viewed from a plane, the first sub-wire 211 positioned in a region overlapping a relatively curved region (nose, cheeks, etc.) of the user's face may be provided in a curved shape, and the first sub-wire 211 positioned in a region overlapping a relatively planar region (forehead, etc.) may be provided in a straight line. Accordingly, when the mask 1000 is attached to the user's face, it is possible to solve a problem that the first wire 210 is damaged due to deformation of the mask 1000. In addition, the first sub-wire 211 may be provided in a form in which straight lines and curves are mixed to maintain electrical characteristics and at the same time reduce the ratio occupied by the first wire 210, thereby reducing overall manufacturing costs.

The piezoelectric element 300 may be disposed on the first substrate 110. In detail, the piezoelectric element 300 may be disposed on the first wire 210 and electrically connected to the first wire 210. The piezoelectric element 300 may include a ceramic material. As an example, the piezoelectric element 300 may include at least one of ZnO, AN, $LiNbO_4$, lead antimony stannate, lead magnesium tantalate, lead nickel tantalate, titanates, tungstates, zirconates, or lead including lead zirconate titanate [$Pb(Zr_xTi_{1-x})O_3$(PZT)], lead lanthanum zirconate titanate (PLZT), lead niobium Zirconate titanate (PNZT), $BaTiO_3$, $SrTiO_3$, lead magnesium niobate, lead nickel niobate, lead manganese niobate, lead zinc niobate, lead including lead titanate, barium, bismuth, or niobates of strontium.

The piezoelectric element 300 may be disposed on the first wire 210 in plural. In detail, a plurality of piezoelectric elements 300 may be disposed to be spaced apart from each other on the first sub-wire 211. For example, the plurality of piezoelectric elements 300 may be disposed on one first sub-wire 211, and the plurality of piezoelectric elements 300 may be spaced apart at equivalent intervals on the first sub-wire 211. In addition, a piezoelectric element 300 disposed on one first sub-wire 211 may or may not overlap a piezoelectric element 300 disposed on the first sub-wire 211 closest to the one first sub-wire 211 in the second direction.

In addition, some of the piezoelectric elements 300 may be spaced apart at equivalent intervals, and the remaining piezoelectric elements 300 may not be disposed at equivalent intervals. For example, a space between the piezoelectric elements 300 may be disposed at equivalent intervals in a region overlapping a relatively planar region of the user's face surface. However, the space between the piezoelectric elements 300 may not be disposed at equivalent intervals in a region overlapping a relatively curved skin region. That is, the space between the piezoelectric elements 300 may be relatively narrow or large depending on the degree of curvature of the skin surface. As an example, the space between the piezoelectric elements 300 disposed in the region overlapping the curved region such as a user's nose and cheeks, may be relatively narrow. Accordingly, the mask 1000 according to the embodiment may effectively provide ultrasonic energy even to the curved skin.

The piezoelectric element 300 according to the embodiment may be disposed on the entire region of the mask 1000 at predetermined intervals and may generate evenly the ultrasonic energy in the entire region of the mask 1000.

The piezoelectric element 300 may overlap the first sub-wire 211. In detail, a lower surface of the piezoelectric element 300 may overlap the first sub-wire 211 in the vertical direction.

The piezoelectric element 300 may generate wave energy by an applied current. For example, the piezoelectric element 300 may generate ultrasonic energy by the applied current. In detail, the piezoelectric element 300 may generate ultrasonic energy of about 1 MHz or less. In more detail, the piezoelectric element 300 may generate ultrasonic energy of about 10 KHz to about 1 MHz. In more detail, the piezoelectric element 300 may generate ultrasonic energy of about 100 KHz to about 800 KHz. The ultrasonic energy generated by the piezoelectric element 300 may move in a direction of one surface of the mask 1000, and may be transmitted to the user's skin to massage the user's skin.

A thickness of the piezoelectric element 300 may be about 1500 μm or less. In detail, the thickness of the piezoelectric element 300 may be about 1200 μm or less. Preferably, the thickness of the piezoelectric element 300 may be about 1000 μm or less. It is preferable that the thickness of the piezoelectric element 300 satisfies the above-described range in consideration of the overall thickness and variable characteristics of the mask 1000.

The piezoelectric element 300 may have various shapes. For example, the piezoelectric element 300 may have a polygonal column shape in which lower and upper surfaces are polygonal, and the lower and upper surfaces may have a circular column shape. In addition, one surface of the lower and upper surfaces of the piezoelectric member 300 may be a polygon and the other surface may have a pillar shape. As an example, an area of at least one of the lower surface and the upper surface of the piezoelectric element 300 may be about 100 $mm^2$ or less.

As described above, the piezoelectric element 300 may have various pillar shapes, and intensity and an oscillation direction of ultrasonic energy generated according to the pillar shape may be controlled. In addition, the intensity of ultrasonic energy transmitted to the user's skin may be adjusted according to a size, arrangement interval, arrangement density, and the like of the piezoelectric element 300.

The piezoelectric element 300 may generate various waves. As an example, the piezoelectric element 300 may generate at least one wave of a transverse wave in which a traveling direction of wave and a vibration direction of medium are perpendicular, and a longitudinal wave in which the traveling direction of wave and the vibration direction of medium are the same. In addition, the piezoelectric element 300 may multiple-resonate. For example, the piezoelectric element 300 may include at least one via hole and may multiple-resonate by the formed via holes. In this case, an upper area of the via holes may be about 10% to about 45% of an area of the upper surface of the piezoelectric element 300 for multiple resonance. In addition, when the piezoelectric element 300 multiple-resonates by the via holes, the number of multiple resonance frequency regions may correspond to the number of the via holes. That is, the piezoelectric element 300 may emit wavelengths of various frequency ranges, for example, ultrasonic energy, as the number of the via holes increases in a set number range of via holes.

The embodiment may include a first metal layer 350 disposed on the piezoelectric element 300. In detail, the embodiment may further include the first metal layer 350 disposed on an upper surface of the piezoelectric element 300 in order to improve vibration characteristics of the piezoelectric element 300. That is, the first metal layer 350 may be a vibration plate.

The first metal layer 350 may include a metal material and may be electrically connected to the piezoelectric element 300. As an example, the first metal layer 350 may include at least one metal of aluminum (Al), copper (Cu), zinc (Zn), iron (Fe), nickel (Ni), chromium (Cr), silver (Ag), gold (Pt), stainless steel (SUS), and alloys thereof.

The first metal layer 350 may have a shape corresponding to the piezoelectric element 300. For example, the first metal layer 350 may have a planar shape corresponding to the upper surface of the piezoelectric element 300. In addition, the first metal layer 350 may have a width in a horizontal direction corresponding to the upper surface of the piezoelectric element 300.

A thickness of the first metal layer 350 may be about 1500 μm or less. In detail, the thickness of the first metal layer 350 may be about 1200 μm or less. Preferably, the thickness of the first metal layer 350 may be about 1000 μm or less. It is preferable that the thickness of the first metal layer 350 satisfies the above-described range in consideration of the variable characteristics of the mask 1000 and the vibration characteristics of the piezoelectric element 300.

The second substrate 120 may be disposed on the piezoelectric element 300. The second substrate 120 may be disposed on the first metal layer 350. The second substrate 120 may be transparent and include a material in consideration of moisture barrier properties, thermal stability, and the like. In addition, the second substrate 120 may include a material that has flexibility and varies according to a shape of the user's curved skin. As an example, the second substrate 120 may include a resin material such as polyethylene terephthalate (PET), polyethylene naphthalate (PEN), and polyimide (PI). The second substrate 120 may be provided in a form of a film. The second substrate 120 may have the same material and the same shape as the first substrate 110, but the embodiment is not limited thereto.

The second substrate 120 may have a thickness of about 0.5 μm to about 5 μm. When the thickness of the second substrate 120 is less than about 0.5 μm, there may be a problem that a region of the second substrate 120 overlapping the components is struck by a weight of the components disposed on the second substrate 120, for example, the piezoelectric element 300. Accordingly, reliability of the second substrate 120 may be deteriorated, and a problem of alignment of the components disposed on the second substrate 120 may occur. In addition, when the thickness of the second substrate 120 exceeds about 5 μm, the overall thickness of the mask 1000 may be increased. Accordingly, there is a problem that the mask 1000 may not be efficiently varied according to the shape of the user's skin, and thus the mask 1000 does not effectively adhere to the user's skin. Preferably, the second substrate 120 may have a thickness of about 0.5 μm to about 3 μm. When the thickness of the second substrate 120 satisfies the above-described range, the second substrate 120 may be efficiently varied in a form corresponding to the user's skin and the overall thickness and weight of the mask 1000 may be reduced while maintaining reliability and alignment characteristics. The second substrate 120 may have the same thickness as the first substrate 110, but the embodiment is not limited thereto.

The second wire 220 may be disposed under the second substrate 120. The second wire 220 may be electrically connected to the piezoelectric element 300. The second wire 220 may be electrically connected to the first metal layer 350. The second wire 220 may include a conductive material. As an example, the second wire 220 may include at least one metal of aluminum (Al), copper (Cu), silver (Ag), gold (Au), chromium (Cr), nickel (Ni), molybdenum (Mo), titanium (Ti), and alloys thereof. In addition, the second wire 220 may include a non-metal such as carbon, and the like. The second wire 220 may include the same material as the first wire 210.

The second wire 220 may be disposed on one surface of the second substrate 120 facing the piezoelectric element 300. That is, the second wire 220 may be disposed on one surface opposite to the other surface of the second substrate 120 facing the user's skin. The second wire 220 may be in direct contact with one surface of the second substrate 120 and may extend in a different direction from the first wire 210. For example, the second wire 220 may extend in the second direction perpendicular to the first direction in which the first wire 210 extends. The second wire 220 may be formed on one surface of the second substrate 120 by a process such as deposition or printing.

The second wire 220 may include a plurality of second sub-wires 221 disposed on the second substrate 120. The plurality of second sub-wires 221 may extend in the second direction and may be spaced apart from each other in the first direction. The plurality of second sub-wires 221 may be electrically connected to each other.

The second sub-wire 221 may overlap the piezoelectric element 300. In detail, the second sub-wire 221 may overlap the upper surface of the piezoelectric element 300 in the vertical direction.

The first wire 210 and the second wire 220 may be disposed to cross each other. In detail, when viewed in a plane as shown in FIG. 3, the first sub-wire 211 and the second sub-wire 221 may be disposed to cross each other in a mesh shape, and an open region OA in which the electrodes 210 and 220 are not disposed may be formed between the sub-wires 211 and 221.

A thickness of the second sub-wire 221 may be about 2 μm to about 50 μm. In detail, the thickness of the second sub-wire 221 may be about 2 μm to about 40 μm. When the thickness of the second sub-wire 221 is less than about 2 μm, electrical characteristics may be deteriorated, and it may be difficult to form uniformly. In addition, when the thickness of the second sub-wire 221 exceeds about 50 μm, the overall thickness of the mask 1000 may increase, and a manufacturing time of the second wire 220 may increase. In addition, the thickness of the second sub-wire 221 is too thick, and thus stretchable characteristics may be deteriorated. Preferably, the thickness of the second sub-wire 221 may be about 30 μm or less in consideration of stretchable characteristics in the horizontal direction, reliability, and process efficiency. The thickness of the second sub-wire 221 is provided equal to the thickness of the first sub-wire 211, so that process efficiency may be improved.

In addition, a line width of the second sub-wire 221 may be greater than the thickness of the second sub-wire 221. For example, the line width of the second sub-wire 221 may be about 50 μm to about 500 μm. In detail, the line width of the second sub-wire 221 may be about 100 μm to about 450 μm. When the line width of the second sub-wire 221 is less than about 50 μm, reliability may be deteriorated, and when the line width of the second sub-wire 221 exceeds about 500 μm, an elongation may decrease and the stretchable characteristics may be deteriorated. Preferably, the line width of the second sub-wire 221 may be about 100 μm to about 400 μm in consideration of the stretchable characteristics. The line width of the second sub-wire 221 is provided equal to the line width of the first sub-wire 211, so that process efficiency may be improved.

The second wire 220 may have various shapes. For example, when viewed in a plane, each of the plurality of second sub-wires 221 may have a shape extending in the second direction as shown in FIG. 3. In detail, the plurality of second sub-wires 221 may have equivalent intervals from the adjacent second sub-wires 221 and may have a linear shape extending in the second direction.

Alternatively, when viewed in a plane, each of the plurality of second sub-wires 221 may have a curved shape extending in the second direction. For example, each of the plurality of second sub-wires 221 may be provided in a form in which a wavy pattern is repeated. In this case, the second sub-wire 221 may have a curvature pattern of about 3R to about 20R (mm). Accordingly, when the mask 1000 is stretched or contracted in one direction, the second wire 220 may have the stretchable characteristics and may not be cut. Preferably, the second sub-wire 221 may have a curvature pattern of about 5R to about 15R (mm). In addition, the second sub-wire 221 may have an elongation of about 10% to about 50%. Accordingly, the second wire 220 may have more improved stretchable characteristics, thereby improving reliability and improving adhesion to the user's skin.

Still alternatively, although not shown in the drawing, when viewed in a plane, each of the plurality of second sub-wires 221 may have a shape in which a pattern in which a straight line and a curve extending in the second direction are mixed is repeated. For example, when viewed in a plane, the second sub-wire 221 positioned in a region overlapping a relatively curved region (nose, cheeks, etc.) of the user's face may be provided in a curved shape, and the second sub-wire 221 positioned in a region overlapping a relatively planar region (forehead, etc.) may be provided in a straight line. Accordingly, when the mask 1000 is attached to the user's face, it is possible to solve a problem that the second wire 220 is damaged due to deformation of the mask 1000.

In addition, the second sub-wire 221 may be provided in a form in which straight lines and curves are mixed to maintain electrical characteristics and at the same time reduce the ratio occupied by the second wire 220, thereby reducing overall manufacturing costs.

It is preferable that the second wire 220 has the same shape as the first wire 210 in consideration of the stretchable characteristic of the mask 1000. That is, it is preferable that the first wire 210 and the second wire 220 disposed in the same region have the same shape as each other.

In addition, although not shown in the drawings, the second wire 220 may extend on the second substrate 120 in the same direction as the first wire 210. That is, the second wire 220 may extend in the same first direction as the first wire 210.

The mask 1000 according to the embodiment may include the first base layer 510. The first base layer 510 may be disposed under the first substrate 110. The first base layer 510 may be disposed on the other surface opposite to one surface of the first substrate 110. The first base layer 510 may be disposed in direct contact with the other surface of the first substrate 110.

The first base layer 510 may include a material harmless to the human body. In addition, the first base layer 510 may include a soft and elastic material. For example, the first base layer 510 may include at least one material of silicone, a thermoplastic resin, a thermoplastic silicone resin, a thermoplastic elastomer, a polyurethane elastomer, an ethylene vinyl acetate (EVA), a polyvinyl chloride (PVC) in which a harmless plasticizer and a stabilizer are added. Preferably, the first base layer 510 may include a silicone elastomer among them that is relatively light, can minimize irritation upon contact with the user's skin, and has a predetermined elasticity.

The first base layer 510 may be disposed to cover the entire region of the other surface of the first substrate 110. That is, when viewed in a plane, a plan area of the first base layer 510 may correspond to an area of the other surface of the first substrate 110. In addition, the plan area of the first base layer 510 may be greater than the area of the other surface of the first substrate 110. Accordingly, the first base layer 510 may be disposed surrounding a side surface of the first substrate 110. The first base layer 510 may prevent the other surface of the first substrate 110 from being exposed to the outside.

In addition, the first base layer 510 may reflect wavelengths emitted from the piezoelectric element 300 in a direction of one surface of the mask 1000. That is, the first base layer 510 may be a reflective layer. To this end, a thickness of the first base layer 510 may be equal to or smaller than a thickness of the second base layer 520 to be described later. In detail, the thickness of the first base layer 510 may be equal to or smaller than the thickness of the second base layer 520 in order to reflect the wavelengths emitted from the piezoelectric element 300 toward the first substrate 110 to the first base layer 510.

The thickness of the first base layer 510 may be about 50 μm to about 1 mm. When the thickness of the first base layer 510 is less than about 50 μm, the thickness of the first base layer 510 is relatively small, so that the first substrate 110 may not be effectively protected. In addition, when the thickness of the first base layer 510 exceeds about 1 mm, the thickness of the entire mask 1000 may be increased, and most of the wavelengths emitted from the piezoelectric element 300 in a direction of the first substrate 110 pass through the first base layer 510 and are reflected by the first base layer 510, so that the amount of reflection in the direction of one surface of the mask 1000 may be small. In addition, the thickness of the second base layer 520 may be increased for reflection in the direction of one surface of the mask 1000, and a region of the wavelengths generated from the piezoelectric element 300 is high for reflection, and thus it may not be suitable for use in the mask 1000. Therefore, it is preferable that the thickness of the first base layer 510 satisfies the above-described range in order to prevent the above problems. More preferably, the thickness of the first base layer 510 may be about 100 μm to about 700 μm. That is, it is preferable that the first base layer 510 has a thickness range of about 100 μm to about 700 μm in consideration of reliability, reflective properties, and the thickness and weight of the mask 1000 to be manufactured.

In addition, the first base layer 510 may have pores or the like formed therein in order to effectively reflect the wavelengths generated from the piezoelectric element 300, but the embodiment is not limited thereto.

The mask 1000 according to the embodiment may include the second base layer 520. The second base layer 520 may be disposed on the second substrate 120. The second base layer 520 may be disposed on the other surface opposite to the one surface of the second substrate 120. The second base layer 520 may be disposed in direct contact with the other surface of the second substrate 120.

The second base layer 520 is a portion that may be in contact with the skin while facing the user's skin, and may include a material harmless to the human body. In addition, the second base layer 520 may include a soft and elastic material. For example, the second base layer 520 may include at least one material of silicone, a thermoplastic resin, a thermoplastic silicone resin, a thermoplastic elastomer, a polyurethane elastomer, an ethylene vinyl acetate (EVA), a polyvinyl chloride (PVC) in which a harmless plasticizer and a stabilizer are added. Preferably, the second base layer 520 may include a silicone elastomer among them that is relatively light, can minimize irritation upon contact with the user's skin, and has a predetermined elasticity. That is, the first base layer 510 may be provided with the same material as the second base layer 520.

The second base layer 520 may be disposed to cover the entire region of the other surface of the second substrate 120. That is, when viewed in a plane, a plan area of the second base layer 520 may correspond to an area of the other surface of the second substrate 120. In addition, the plan area of the second base layer 520 may be greater than the area of the other surface of the second substrate 120. Accordingly, the second base layer 520 may be disposed surrounding a side surface of the second substrate 120. The second base layer 520 may prevent the other surface of the second substrate 120 from being exposed to the outside.

In addition, the second base layer 520 may pass through the wavelengths emitted from the piezoelectric element 300 in the direction of one surface of the mask 1000 to transmit the wavelengths to the user's skin. That is, the second base layer 520 is transmission layer and may be a matching layer. To this end, the thickness of the second base layer 520 may vary depending on an impedance of the second base layer 520 and a driving frequency of the piezoelectric element 300. In addition, the thickness of the second base layer 520 may be equal to or greater than the thickness of the first base layer 510.

As an example, when the driving frequency of the piezoelectric element 300 is about 1 MHz or less, the thickness of the second base layer 520 may be about 50 μm to about 1 mm. When the thickness of the second base layer 520 is less than about 50 μm, the thickness of the second base layer 520 is relatively small, so that the second substrate 120 may not be effectively protected. In addition, when the thickness of the second base layer 520 exceeds about 1 mm, the thickness of the entire mask 1000 may be increased. It is preferable that the thickness of the second base layer 520 satisfies the above-described range in order to effectively pass through the wavelengths emitted from the piezoelectric element 300. Preferably, the thickness of the second base layer 520 may have a thickness range of 100 μm to about 700 μm in consideration of reliability, transmission characteristics, and the thickness and weight of the mask 1000 to be manufactured.

Accordingly, the wave energy emitted from the piezoelectric element 300 may be reflected by the first base layer 510 to move toward the second base layer 520, and the wave energy may be effectively transmitted to the user's skin through the second substrate 120 and the second base layer 520.

The mask 1000 according to the embodiment may include the first protective layer 551. The first protective layer 551 may be disposed between the first substrate 110 and the second substrate 120. The first protective layer 551 may be disposed in direct contact with one surface of the first substrate 110 and one surface of the second substrate 120.

The first protective layer 551 may include a material having softness and elasticity. For example, the first protective layer 551 may include at least one material of silicone, a thermoplastic resin, a thermoplastic silicone resin, a thermoplastic elastomer, a polyurethane elastomer, an ethylene vinyl acetate (EVA), a polyvinyl chloride (PVC) in which a harmless plasticizer and a stabilizer are added. The first protective layer 551 may be preferable to include a silicone elastomer among them that is relatively light, can minimize irritation upon contact with the user's skin, and has a predetermined elasticity.

The first protective layer 551 may be disposed between the first substrate 110 and the second substrate 120 to protect the piezoelectric element 300. In detail, the first protective layer 551 may be disposed between the substrates 110 and 120 to surround the piezoelectric element 300 and the wires 210 and 220 to protect the components. In addition, the first protective layer 551 may be connected to the first base layer 510 and the second base layer 520. For example, the first passivation layer 551 may be connected to the first base layer 510 and the second base layer 520 in an end region of the mask 1000. That is, the first base layer 510, the second base layer 520, and the first protective layer 551 may be integrally formed to be physically connected and support a component disposed therein. The first protective layer 551 may include the same materials as the first base layer 510 and the second base layer 520. That is, since the first base layer 510, the second base layer 520, and the first passivation layer 551 include the same kind of materials, they may have an improved bonding force.

In addition, referring to FIG. 6, the piezoelectric element 300 may include a first electrode 310 disposed on a lower surface thereof. The first electrode 310 may be disposed in an area of about 80% or more of the entire area of the lower surface of the piezoelectric element 300 in consideration of electrical characteristics. The first electrode 310 may be disposed in an area of about 90% of the entire area of the lower surface of the piezoelectric element 300. In addition, the first electrode 310 may be disposed on the entire region of the lower surface of the piezoelectric element 300.

The first electrode 310 may include a conductive material. As an example, the first electrode 310 may include a metal material. In detail, the first electrode 310 may include at least one metal of aluminum (Al), copper (Cu), silver (Ag), gold (Au), chromium (Cr), nickel (Ni), molybdenum (Mo), titanium (Ti), and alloys thereof.

The first electrode 310 may be disposed facing the first wire 210 and may be electrically connected to the first wire 210. In detail, a first bonding layer 251 may be disposed between the first electrode 310 and the first wire 210, and the first electrode 310 and the first wire 210 may be physically and electrically connected by the first bonding layer 251. In this case, an overlapping ratio between the first bonding layer 251 and the first wire 210 may be about 20% or more in consideration of physical and electrical connection characteristics.

The first bonding layer 251 may include at least one metal of aluminum (Al), copper (Cu), silver (Ag), gold (Au), chromium (Cr), nickel (Ni), molybdenum (Mo), titanium (Ti), and alloys thereof.

A thickness of the first bonding layer 251 may be about 100 μm or less. In detail, the thickness of the first bonding layer 251 may be about 20 μm to about 80 μm. Preferably, the thickness of the first bonding layer 251 may be about 30 μm to about 60 μm.

The first bonding layer 251 may be disposed between the first electrode 310 and the first wire 210 to serve as a conductive adhesive. As an example, the first bonding layer 251 may be applied in a form of a paste on the first wire 210, and the piezoelectric element 300 including the first electrode 310 may be disposed on the first bonding layer 251. Accordingly, the piezoelectric element 300 may be physically and electrically connected to the first wire 210.

In addition, the piezoelectric element 300 may include a second electrode 320 disposed on an upper surface thereof. The second electrode 320 may be disposed in an area of about 80% or more of the entire area of the upper surface of the piezoelectric element 300 in consideration of electrical characteristics. In detail, the second electrode 320 may be disposed in an area of about 90% of the entire area of the upper surface of the piezoelectric element 300. In addition, the second electrode 320 may be disposed on the entire region of the lower surface of the piezoelectric element 300.

The second electrode 320 may include a conductive material. As an example, the second electrode 320 may include a metal material. In detail, the second electrode 320 may include at least one metal of aluminum (Al), copper (Cu), silver (Ag), gold (Au), chromium (Cr), nickel (Ni), molybdenum (Mo), titanium (Ti), and alloys thereof.

The second electrode 320 may be disposed facing the second wire 220 and may be electrically connected to the second wire 220. In detail, the first metal layer 350 electrically connected to the second electrode 320 may be disposed on the second electrode 320. A second bonding layer 252 may be disposed between the first metal layer 350 and the second wire 220, and the second electrode 320 and the second wire 220 may be electrically connected by the second bonding layer 252. An overlapping ratio between the second bonding layer 252 and the second wire 220 may be about 20% or more in consideration of physical and electrical connection characteristics.

The second bonding layer 252 may include at least one metal of aluminum (Al), copper (Cu), silver (Ag), gold (Au), chromium (Cr), nickel (Ni), molybdenum (Mo), titanium (Ti), and alloys thereof.

A thickness of the second bonding layer 252 may be about 100 μm or less. In detail, the thickness of the second bonding layer 252 may be about 20 μm to about 80 μm. Preferably, the thickness of the second bonding layer 252 may be about 30 μm to about 60 μm.

The second bonding layer 252 may be disposed between the second electrode 320 and the second wire 220 to serve as a conductive adhesive. In detail, the second bonding layer 252 may be disposed between the first metal layer 350 and the second wire 220 to serve as a conductive adhesive. As an example, the second bonding layer 252 may be applied in the form of the paste on the second wire 220, and the piezoelectric element 300 in which the first metal layer 350 is disposed may be disposed on the second bonding layer 252. Accordingly, the piezoelectric element 300 may be electrically connected to the second wire 220, and the first substrate 110 and the second substrate 120 may be spaced apart from each other at a predetermined interval.

In this case, the first bonding layer 251 may be provided with the same thickness as the second bonding layer 252 to improve the variability of the mask 1000. In addition, the thickness of the first bonding layer 251 may be different from the thickness of the second bonding layer 252. In detail, the thickness of the first bonding layer 251 may be greater than the thickness of the second bonding layer 252. Accordingly, the wavelengths emitted from the piezoelectric element 300 toward the first substrate 110 may be reflected by the first bonding layer 251 to move toward the second substrate 120.

Thereafter, as described above, the first protective layer 551 may be filled in a space between the first substrate 110 and the second substrate 120. The first protective layer 551 may be disposed to surround the piezoelectric element 300, the first wire 210, the second wire 220, the first bonding layer 251, the second bonding layer 252, the first electrode 310, and the second electrode 320, and it is possible to prevent the components from being exposed to the outside.

The mask 1000 according to the embodiment may include the cavity 410. The cavity 410 may be disposed in a region corresponding to the piezoelectric element 300. In detail, the cavity 410 may be disposed in a region overlapping the piezoelectric element 300 in the vertical direction.

The cavity 410 may be an air gap made of air. The cavity 410 may reflect the ultrasonic energy emitted from the piezoelectric element 300 toward the first base layer 510 toward the second base layer 520.

The cavity 410 may have various shapes. For example, a planar shape of the cavity 410 may have a circular shape or a polygonal shape, but the embodiment is not limited thereto. In addition, the cavity 410 may have a planar shape corresponding to the piezoelectric element 300, but the embodiment is not limited thereto.

The cavity 410 may be disposed between the first base layer 510 and the piezoelectric element 300. The cavity 410 may be disposed between the first substrate 110 and the piezoelectric element 300. In detail, the cavity 410 may be disposed between the first electrode 310 and the first substrate 110. The cavity 410 may be disposed in a region overlapping the first wire 210. For example, the cavity 410 may be disposed in a region overlapping a part of the first sub-wire 211 and the first bonding layer 251. In addition, the first protective layer 551 may be disposed around the cavity 410.

A thickness of the cavity 410 may be about 200 μm or less. In detail, the thickness of the cavity 410 may be about 150 μm or less. For example, the thickness of the cavity 410 may correspond to the sum of thicknesses of the first bonding layer 251 and the first wire 210. A shape of the cavity 410 will be described in more detail with reference to drawings to be described later.

FIGS. 7 to 9 are views for describing an arrangement position of a cavity in the mask according to the embodiment. The arrangement relationship, shape, etc. of the cavity 410 according to the embodiment will be described in more detail with reference to FIGS. 7 to 9.

First, referring to FIG. 7, the cavity 410 may be disposed in a region overlapping the first wire 210. In detail, the cavity 410 may be disposed in a region overlapping the first wire 210 in the vertical direction. In detail, the cavity 410 may be disposed in a region overlapping a part of the first sub-wire 211 overlapping the piezoelectric element 300.

The cavity 410 may be disposed in a region where a center of the cavity 410 overlaps a center of the piezoelectric element 300. The cavity 410 may be disposed in the central region of the piezoelectric element 300 to effectively reflect the wave energy emitted from the piezoelectric element 300.

A width of the cavity 410 in the horizontal direction may be different from a width of the piezoelectric element 300 in the horizontal direction. For example, when the planar shape of each of the piezoelectric element 300 and the cavity 410 is circular, a radius d1 of the cavity 410 may be smaller than a radius d2 of the piezoelectric element 300. In detail, the radius d1 of the cavity 410 may be smaller than the radius d2 of the piezoelectric element 300 within a range of about 40% or more of the radius d2 of the piezoelectric element 300. In more detail, the radius d1 of the cavity 410 may be smaller than the radius d2 of the piezoelectric element 300 within a range of about 45% or more of the radius d2 of the piezoelectric element 300. When the radius d1 of the cavity 410 is less than about 40% of the radius d2 of the piezoelectric element 300, a reflectance of waves reflected in the air gap may decrease. Therefore, it may be desirable that the radius d1 of the cavity 410 satisfies the above-described range. In addition, it may be preferable that the radius d1 of the cavity 410 is about 50% or more of the radius d2 of the piezoelectric element 300 in order to minimize the loss and effectively reflect.

In addition, referring to FIG. 8, the cavity 410 may overlap the piezoelectric element 300 in the vertical direction and may not overlap the first wire 210 in the vertical direction. That is, the cavity 410 may be spaced apart from the first wire 210.

In addition, referring to FIG. 9, at least one cavity 410 may be formed between the first substrate 110 and the piezoelectric element 300. As an example, when there are a plurality of cavities 410, the plurality of cavities 410 may be spaced apart in the horizontal direction. Some of the plurality of cavities 410 may overlap the first wire 210 in the vertical direction, and the others may not overlap the first wire 210 in the vertical direction. In this case, each of the plurality of cavities 410 may have a diameter smaller than that of the piezoelectric element 300. In addition, the plurality of cavities 410 may have the same diameter as each other. Alternatively, the plurality of cavities 410 may have different diameters in consideration of reflectance. As an example, a diameter of the cavity 410 overlapping the center of the piezoelectric element 300 may be larger than a diameter of the cavity 410 overlapping an edge of the piezoelectric element 300.

That is, the mask 1000 according to the embodiment may effectively reflect the wave energy emitted from the piezoelectric element 300 by the cavity 410 upward. In addition, since the mask 1000 includes the cavity 410, the thickness of the first base layer 510 may be reduced. Accordingly, the mask 1000 according to the embodiment may have a slimmer shape and may be implemented with a lighter weight.

FIG. 10 is another enlarged view of the region A2 of FIG. 5. Referring to FIG. 10, the mask 1000 according to the embodiment may include a third substrate 421. The third substrate 421 may be disposed between the first substrate 110 and the piezoelectric element 300. In detail, the third substrate 421 may be disposed between the piezoelectric element 300 and the cavity 410. In more detail, the third substrate 421 may be in direct contact with the first electrode 310 facing the cavity 410, and may cover the first electrode 310.

The third substrate 421 may include a silicone-based material and a polymer-based material. In addition, the third substrate 421 may have a shape corresponding to the cavity 410. As an example, a planar shape of the third substrate 421 may be the same as the planar shape of the cavity 410. Accordingly, the third substrate 421 may protect the piezoelectric element 300. In detail, the third substrate 421 may be disposed to cover the first electrode 310, and may prevent the first electrode 310 from being exposed by the cavity 410.

The third substrate 421 may be smaller than the thickness of the cavity 410. For example, the third substrate 421 may have a thickness of about 150 μm or less. In detail, the third substrate 421 may have a thickness of about 120 μm or less. In more detail, the third substrate 421 may have a thickness of about 100 μm or less. It is preferable that the thickness of the third substrate 421 satisfies the above-described range in order to effectively reflect the wave energy through the cavity 410.

FIG. 11 is another cross-sectional view taken along line A-A' of FIG. 4, and FIG. 12 is an enlarged view of region A3 in FIG. 11. In addition, FIG. 13 is another enlarged view of region A3 in FIG. 11. In the description of FIGS. 11 to 13, descriptions of configurations the same as or similar to those of the above-described mask are omitted, and the same reference numerals are assigned to the same as or similar to the configurations.

Referring to FIGS. 11 and 12, the cavity 410 according to the embodiment may be disposed between the first base layer 510 and the first substrate 110. The cavity 410 may be disposed on one surface of the first base layer 510 facing the piezoelectric element 300. In detail, the cavity 410 may have a concave shape from one surface of the first base layer 510 toward the other surface opposite to the one surface.

The cavity 410 may be disposed in a region corresponding to the piezoelectric element 300. The cavity 410 may overlap the piezoelectric element 300 in the vertical direction. In detail, the center of the cavity 410 may overlap the center of the piezoelectric element 300.

The thickness of the cavity 410 may be about 200 μm or less. In detail, the thickness of the cavity 410 may be about 150 μm or less. In addition, the width of the cavity 410 in the horizontal direction may be different from or equal to the width of the piezoelectric element 300 in the horizontal direction. For example, when the planar shape of each of the piezoelectric element 300 and the cavity 410 is circular, a diameter d3 of the cavity 410 may be about 40% to about 160% of a diameter of the piezoelectric element 300. In detail, the diameter d3 of the cavity 410 may be about 50% to about 150% of the diameter of the piezoelectric element. As the diameter d3 of the cavity 410 satisfies the above-described range, the wave energy of the piezoelectric element 300 may be effectively reflected upward, for example, toward the second substrate 120. In addition, the thickness of the first base layer 510 may be reduced by the cavity 410. Therefore, the mask 1000 according to the embodiment may have a slimmer shape.

In addition, referring to FIG. 13, the mask 1000 according to the embodiment may include a fourth substrate 422. The fourth substrate 422 may be disposed between the first substrate 110 and the cavity 410. In detail, the fourth substrate 422 may be disposed on one surface of the first substrate 110 facing the cavity 410. The fourth substrate 422 may be disposed in direct contact with one surface of the first substrate 110.

The fourth substrate 422 may include a silicone-based material and a polymer-based material. In addition, the fourth substrate 422 may have a shape corresponding to the cavity 410. As an example, a planar shape of the fourth substrate 422 may be the same as the planar shape of the cavity 410. In addition, the fourth substrate 422 may be smaller than the thickness of the cavity 410. For example, the fourth substrate 422 may have a thickness of about 150 μm or less. In detail, the fourth substrate 422 may have a thickness of about 120 μm or less. In more detail, the fourth substrate 422 may have a thickness of about 100 μm or less. It is preferable that the thickness of the fourth substrate 422 satisfies the above-described range in order to effectively reflect the wave energy through the cavity 410.

FIGS. 14 to 16 are views illustrating an example in which an indicator and a protrusion are provided on the mask according to the embodiment.

Referring to FIG. 14, the mask 1000 may include an indicator 610. The indicator 610 may include at least one of members such as an LED, a display, a buzzer, and the like that may transmit visual or auditory information to a user.

The indicator 610 may be disposed outside the mask 1000 to display an operation state of the mask 1000. As an example, the indicator 610 may provide information about the start of the operation of the mask 1000, information notifying that the operation is in progress, and information about the completion of the operation through the auditory information generated from the buzzer. In addition, the indicator 610 may display the operation state according to the light emission color of the LED. In addition, the indicator may display information on an operating frequency domain through the display.

In addition, referring to FIGS. 15 and 16, the mask 1000 may include a protrusion 620 disposed on an outer surface thereof. In detail, the protrusion 620 may be disposed on one surface of the second base layer 520 facing the user's skin.

The protrusion 620 may include a material harmless to the human body and may be disposed to protrude from one surface of the second base layer 520 toward the user's skin. The protrusions 620 may be disposed in a form of a plurality of points spaced apart from each other on one surface of the second base layer 520. In addition, the protrusions 620 may be disposed in a form of a plurality of straight lines or curves spaced apart from each other on one surface of the second base layer 520. In addition, the protrusion 620 may be disposed in a single spiral shape on one surface of the second base layer 520.

When the user wears the mask 1000, the protrusion 620 may form a predetermined space between the mask 1000 and the user's skin. Accordingly, it is possible to prevent cosmetics or drugs between the mask 1000 and the skin from being pushed out to an edge region of the mask 1000 by the pressure generated when the mask 1000 are worn and/or the ultrasonic energy generated from the piezoelectric element 300. That is, the protrusion 620 may serve as a partition wall preventing cosmetics or drugs from getting out of the mask 1000. Therefore, the user may effectively inject cosmetics or drugs into the skin using the mask 1000.

FIG. 17 is a view illustrating a user wearing the mask according to the embodiment, and FIG. 18 is a view illustrating a skin care apparatus to which the mask according to the embodiment is applied.

Referring to FIG. 17, a user 50 may wear the mask 1000. The mask 1000 may include the above-described opening 1010, and the user 50 may secure a view through the opening 1010. In addition, the mask 1000 may include the above-described cutout portion 1020, and the mask 1000 may be effectively close-adhered to the curved skin by the cutout portion 1020. In this case, one surface of the second base layer 520 may be in direct contact with skin of the user 50. In addition, drugs or cosmetics may be disposed between the second bath layer 520 and the skin of the user 50, so that the base layer 520 may be in direct or indirect contact with the skin of the user 50.

The mask 1000 may be operated by receiving power through an external power connected to the mask 1000. In addition, the mask 1000 may be operated by receiving power through a power supply unit (not shown) disposed outside the mask 1000, for example, on a lower surface of the first base layer 510.

In addition, referring to FIG. 18, the mask 1000 may be applied to a skin care apparatus 1 to operate. In detail, referring to FIG. 18, the skin care apparatus 1 may include a main body 10 in which one side thereof is open and including an accommodation space 11 therein.

The main body 10 may include a material that may be light and prevent damage from external impact or contact. As an example, the main body 10 may include a plastic or ceramic material, may have improved reliability from an external environment, and may protect the mask 1000 disposed inside the accommodation space 11. In addition, the main body 10 may include a viewing part 13 formed at a position corresponding to the user's eyes. The viewing part 13 is formed in a region corresponding to the opening 1010 of the mask 1000, and the user may secure an external view through the viewing part 13.

The mask 1000 may be disposed in the accommodation space 11 of the main body 10. The mask 1000 may be disposed between the main body 10 and the user's skin. In detail, the first base layer 510 of the mask 1000 may be disposed to face the accommodation space 11 of the main body 10, and the second base layer 520 of the mask 1000 may be disposed to face the user's skin.

The mask 1000 may be coupled to the main body 10. For example, the mask 1000 may be fixed to a set position in the accommodation space 11 by a fastening member (not shown) and may have a structure that is detachable from the main body 10.

The mask 1000 may be supplied with power through the power supply unit (not shown) disposed outside the mask 1000, for example, on the lower surface of the first base layer 510. Alternatively, the mask 1000 may be connected to the main body 10 to be supplied with power through the power supply unit (not shown) disposed on the main body 10.

The mask 1000 may include a deformable member (not shown) disposed on the lower surface of the first base layer 510. The deformable member may be in direct contact with the first base layer 510 and may be disposed facing the accommodation space 11 of the main body 10. That is, the deformable member may be disposed between the main body 10 and the first base layer 510 of the mask 1000.

The deformable member may include a material of which shape is changed by external pressure. For example, the deformable member may include a material such as an air gap or a sponge, but the embodiment is not limited thereto, and may include various materials of which shape is changed by external pressure. Accordingly, when the user puts on the skin care apparatus 1, the deformable member may be deformed into a shape corresponding to the shape of the user's face. Therefore, the ultrasonic mask 1000 and the user's skin may be effectively close-adhered to each other. In addition, when a plurality of users put on the skin care apparatus 1, the deformable member is deformed to correspond to each face shape, so that the user's skin and the mask 1000 may be effectively close-adhered to each other.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Thus, it should be construed that the contents related to such combination and modification are included in the scope of the present invention.

In addition, the above description has been focused on the embodiments, but it is merely illustrative and does not limit the present invention. Those skilled in the art to which the embodiments pertain may appreciate that various modifications and applications not illustrated above are possible without departing from the essential features of the embodiment. For example, each component particularly represented in the embodiments may be modified and realized. In addition, it should be construed that differences related to such a modification and an application are included in the scope of the present invention defined in the appended claims.

The invention claimed is:

1. A mask comprising:
- a first substrate disposed on a first base layer;
- a first wire disposed on the first substrate;
- a piezoelectric element disposed on the first wire;
- a second wire disposed on the piezoelectric element;
- a second substrate disposed on the second wire;
- a second base layer disposed on the second substrate; and
- a cavity disposed between the first base layer and the piezoelectric element,
- wherein the cavity is disposed in a region overlapping the piezoelectric element in a vertical direction.

2. The mask of claim 1, wherein the cavity is disposed between the first substrate and the piezoelectric element, and
- a width of the cavity in a horizontal direction is 40% or more of a width of the piezoelectric element in the horizontal direction.

3. The mask of claim 2, wherein the piezoelectric element overlaps the first wire in the vertical direction.

4. The mask of claim 2, wherein the piezoelectric element does not overlap the first wire in the vertical direction.

5. The mask of claim 2, comprising
- a third substrate disposed between the piezoelectric element and the cavity,
- wherein the third substrate includes a silicone-based material and a polymer-based material.

6. The mask of claim 5,
- wherein piezoelectric element includes a first electrode disposed facing the cavity, and
- wherein the third substrate is in direct contact with the first electrode.

7. The mask of claim 5, wherein a width of the cavity in the horizontal direction is 40% to 160% of a width of the piezoelectric element in the horizontal direction.

8. The mask of claim 7, comprising
- a fourth substrate disposed between the first substrate and the cavity, wherein the fourth substrate includes a silicone-based material and a polymer-based material.

9. The mask of claim 1, wherein the cavity is disposed between the first base layer and the first substrate.

10. The mask of claim 1, wherein the cavity is an air gap containing air.

11. The mask of claim 1, wherein a thickness of the cavity is 200 μm or less.

12. The mask of claim 1, wherein the cavity is disposed in a region where a center of the cavity overlaps a center of the piezoelectric element.

13. The mask of claim 1, wherein the first wire and the second wire are formed in a curved shape having a radius of curvature of 3R to 20R (mm).

14. The mask of claim 1, wherein the piezoelectric element generates ultrasonic energy of 10 KHz to about 1 MHz.

15. The mask of claim 1, wherein a thickness of the first substrate and a thickness of the second substrate are 0.5 μm to 5 μm.

16. The mask of claim 1, wherein a thickness of the first wire and a thickness of the second wire are 2 μm to 50 μm.

17. The mask of claim 1, comprising a first metal layer disposed between the piezoelectric element and the second wire.

18. The mask of claim 1, comprising a protective layer disposed between the first and second substrates to surround the piezoelectric element, wherein the protective layer includes a same material as that of at least one of the first and second base layers.

19. A skin care apparatus comprising:

a main body in which one side thereof is open and an accommodation space is formed inside an open region; and a mask according to claim 1 disposed in the open region and connected to the main body.

* * * * *